(12) United States Patent
Zhang et al.

(10) Patent No.: US 12,302,134 B2
(45) Date of Patent: May 13, 2025

(54) EXTENDING UE FAST DORMANCY AT UPPER LAYERS

(71) Applicant: QUALCOMM Incorporated, San Diego, CA (US)

(72) Inventors: Juan Zhang, San Diego, CA (US); Ajith Tom Payyappilly, San Diego, CA (US); Tom Chin, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 148 days.

(21) Appl. No.: 17/116,438

(22) Filed: Dec. 9, 2020

(65) Prior Publication Data

US 2022/0182858 A1    Jun. 9, 2022

(51) Int. Cl.
*H04W 24/08* (2009.01)
*H04W 76/30* (2018.01)
*H04W 80/02* (2009.01)

(52) U.S. Cl.
CPC .......... *H04W 24/08* (2013.01); *H04W 76/30* (2018.02); *H04W 80/02* (2013.01)

(58) Field of Classification Search
CPC ..... H04W 24/08; H04W 76/30; H04W 76/38; H04W 76/27; H04W 80/02; H04W 52/0229; H04W 52/0251
See application file for complete search history.

(56) References Cited

U.S. PATENT DOCUMENTS

| 8,654,691 | B2* | 2/2014 | Anderson ......... H04W 52/0232 370/465 |
| 9,198,219 | B2 | 11/2015 | Huang et al. |
| 10,375,646 | B2 | 8/2019 | Manepalli et al. |

(Continued)

OTHER PUBLICATIONS

Ericsson, et al., "UE Assistance For Connection Release", 3GPP Draft, R2-2003289, 3GPP TSG-RAN2 Meeting #109bis-e, 3rd Generation Partnership Project (3GPP), Mobile Competence Centre, 650, Route Des Lucioles, F-06921 Sophia-Antipolis Cedex, France, vol. RAN WG2, no. Online Meeting, DEFAULT_VALUE, Apr. 10, 2020 (Apr. 10, 2020), XP051871277, 3 Pages, Retrieved from the Internet: URL: https://ftp.3gpp.org/tsg_ran/WG2_RL2/TSGR2_109bis-e/Docs/R2-2003289.zip R2-2003289 UE assistance for connection release.docx [retrieved on Apr. 10, 2020] section 2.

(Continued)

*Primary Examiner* — Meng Vang
*Assistant Examiner* — Hector Reyes
(74) *Attorney, Agent, or Firm* — Paul M. McAdams; Polsinelli LLP

(57) ABSTRACT

A method includes monitoring, at an upper layer of the UE, PDU activity for one or more PDU sessions that are associated with one or more DNNs. The method includes determining that each of the one or more PDU sessions has a period of inactivity based on at least one of an expiration of an activity check timer, accumulated inactivity cycles, or a dormancy indication associated with each of the one or more PDU sessions. The method includes indicating, to a lower layer of the UE, to provide UE assistance information to a base station for a RRC connection release between the UE and the base station.

43 Claims, 10 Drawing Sheets

(56) References Cited

U.S. PATENT DOCUMENTS

| | | | |
|---|---|---|---|
| 2003/0189951 A1* | 10/2003 | Bi | H04W 76/38 |
| | | | 370/503 |
| 2005/0021770 A1 | 1/2005 | Helm et al. | |
| 2010/0118752 A1* | 5/2010 | Suzuki | H04W 76/28 |
| | | | 370/311 |
| 2011/0289161 A1* | 11/2011 | Rankin, Jr. | H04L 51/216 |
| | | | 709/206 |
| 2012/0020393 A1* | 1/2012 | Patil | H04W 76/38 |
| | | | 455/67.11 |
| 2012/0094722 A1* | 4/2012 | Kim | H04W 52/0251 |
| | | | 455/566 |
| 2012/0120799 A1* | 5/2012 | Brisebois | H04W 76/27 |
| | | | 370/231 |
| 2012/0120828 A1* | 5/2012 | Anderson | H04W 76/28 |
| | | | 370/252 |
| 2012/0281561 A1* | 11/2012 | Shukla | H04W 76/38 |
| | | | 370/252 |
| 2013/0329637 A1* | 12/2013 | Kodali | H04W 76/27 |
| | | | 370/328 |
| 2014/0057639 A1* | 2/2014 | Nanjaiah | H04W 76/38 |
| | | | 455/450 |
| 2014/0064134 A1* | 3/2014 | Huang | H04W 76/38 |
| | | | 370/253 |
| 2014/0199979 A1* | 7/2014 | Singhai | H04W 52/0212 |
| | | | 455/418 |
| 2015/0146593 A1* | 5/2015 | Patil | H04W 52/0229 |
| | | | 370/311 |
| 2019/0104474 A1* | 4/2019 | Raghunathan | H04W 52/0251 |
| 2019/0174571 A1* | 6/2019 | Deenoo | H04W 76/11 |
| 2020/0252875 A1* | 8/2020 | Qiu | H04W 52/0248 |
| 2022/0132417 A1* | 4/2022 | Maleki | H04W 52/0216 |
| 2022/0167448 A1* | 5/2022 | Palle | H04W 76/30 |

OTHER PUBLICATIONS

International Search Report and Written Opinion—PCT/US2021/058992—ISA/EPO—Mar. 4, 2022.

OPPO: "CR for UE Assistance Information for Release Preference", 3GPP Draft, R2-2007368, 3GPP TSG-RAN2 Meeting #111 electronic, 3rd Generation Partnership Project (3GPP), Mobile Competence Centre, vol. RAN WG2, no. electronic, Aug. 17, 2020-Aug. 28, 2020, Aug. 7, 2020 (Aug. 7, 2020), XP051912122, 13 Pages, Retrieved from the Internet: URL: https://ftp.3gpp.org/tsg_ran/WG2_RL2/TSGR2_111-e/Docs/R2-2007368.zip R2-2007368- CR for UE assistance Information for releasePreference.doc [retrieved on Aug. 7, 2020] section 5.7.4.2.

* cited by examiner

EXTENDING UE FAST DORMANCY AT UPPER LAYERS

BACKGROUND

Technical Field

The present disclosure relates generally to communication systems, and more particularly, to wireless communication involving user equipment (UE) fast dormancy.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE) or at a dormancy manager of the UE. The apparatus may monitor, at an upper layer of the UE, protocol data unit (PDU) activity for one or more PDU sessions that are associated with one or more data network names (DNNs). The apparatus may determine that each of the one or more PDU sessions has a period of inactivity based on at least one of an expiration of an activity check timer, accumulated inactivity cycles, or a dormancy indication associated with each of the one or more PDU sessions. The apparatus may indicate, to a lower layer of the UE, to provide UE assistance information to a base station for a radio resource control (RRC) connection release between the UE and the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
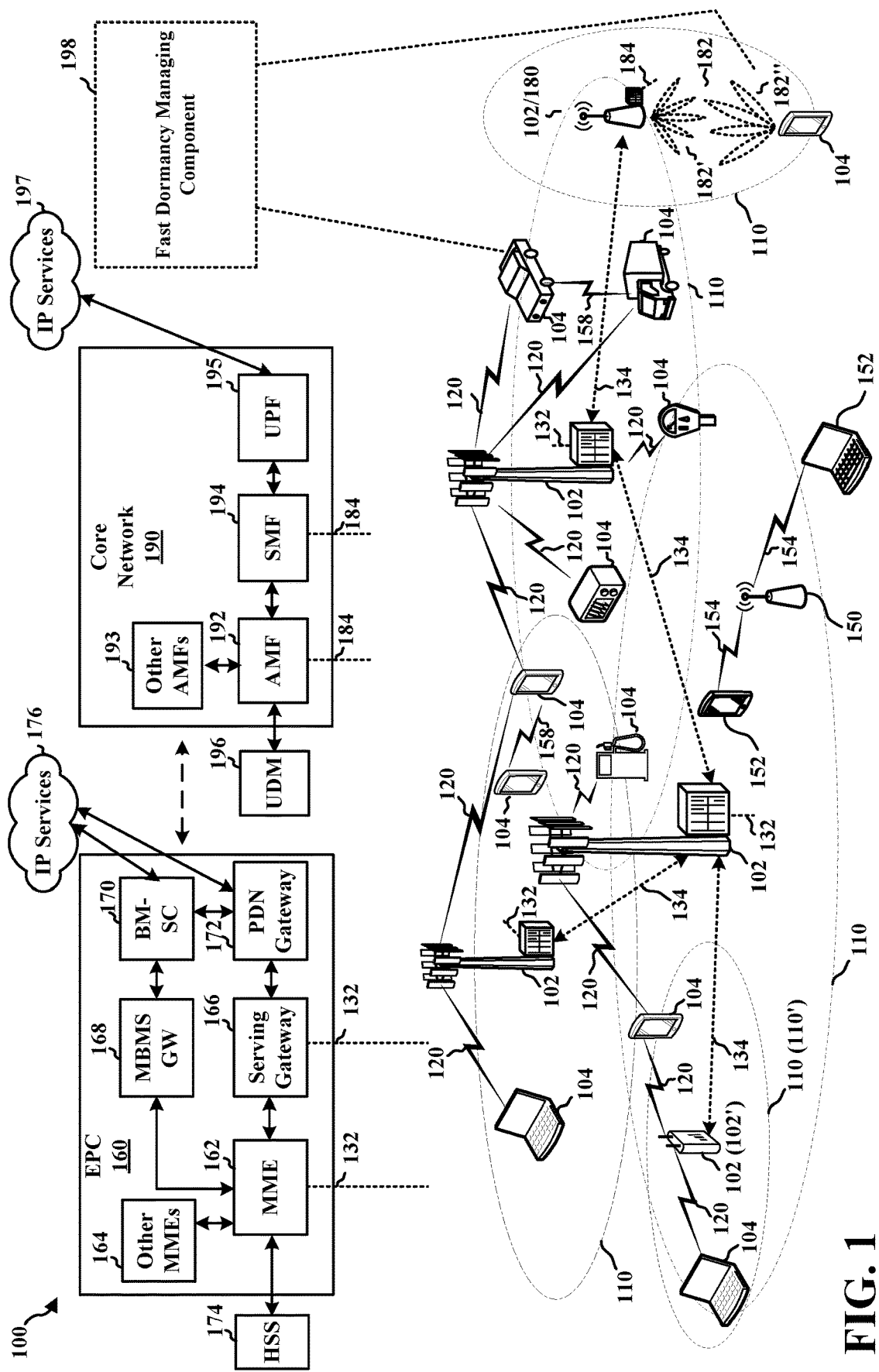
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In order to reduce power consumption and network utilization between a UE and a network when there is no data activity, the network may decide to bring down or release the RRC connection between the UE and the network after a period of inactivity. In some examples, the network may be in control of the dormancy procedure (i.e., releasing the RRC connection). For example, the network may be configured to initiate an inactivity timer when it detects there is no data activity, and the network may initiate the dormancy procedure when the inactivity timer expires without receiving/considering any input from the UE. Different networks may be configured with different time periods/threshold for the inactivity timer. In other examples, a UE may have the capability to inform a network that it has no more data to transmit and/or receive, and that the network may bring down/release the RRC connection. This may enable the network to terminate the RRC connection in advance instead of waiting for its inactivity timer to expire. The ability for a UE to inform or to provide input to the network to bring down/release the RRC connection may be referred to as a "fast dormancy" or a "fast dormancy procedure" throughout the specification.

Aspects presented herein may enable a UE (e.g., the UE 104) and/or a monitoring module (e.g., a dormancy manager) at an upper layer of the UE to monitor PDU activities that are associated with one or more DNNs, and to indicate for a lower layer of the UE to provide UE assistance information to the network to enable fast dormancy.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include a fast dormancy managing component 198 configured to monitor PDU activities associated with the one or more DNNs. In one aspect, the fast dormancy managing component 198 may be configured to monitor, at an upper layer of the UE, PDU activity for one or more PDU sessions that are associated with one or more DNNs. The fast dormancy managing component 198 may also be configured to determine that each of the one or more PDU sessions has a period of inactivity based on at least one of an expiration of an activity check timer, accumulated inactivity cycles, or a dormancy indication associated with each of the one or more PDU sessions. The fast dormancy managing component 198 may also be configured to indicate, to a lower layer of the UE, to provide UE assistance information to a base station for a RRC connection release between the UE and the base station.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5GNR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
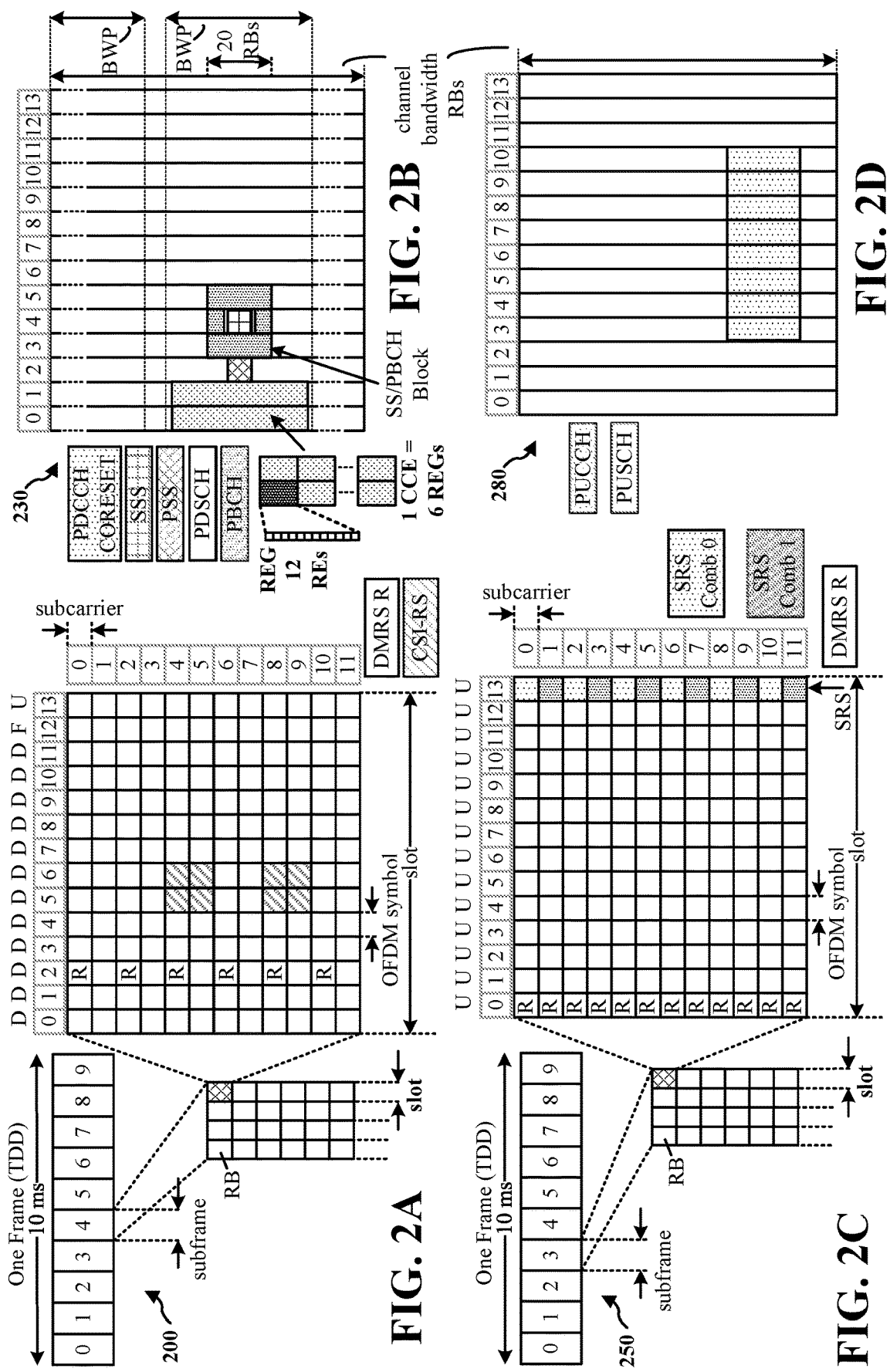
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 29 slots/subframe. The subcarrier spacing and symbol length/duration are a function of the numerology. The subcarrier spacing may be equal to $2*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
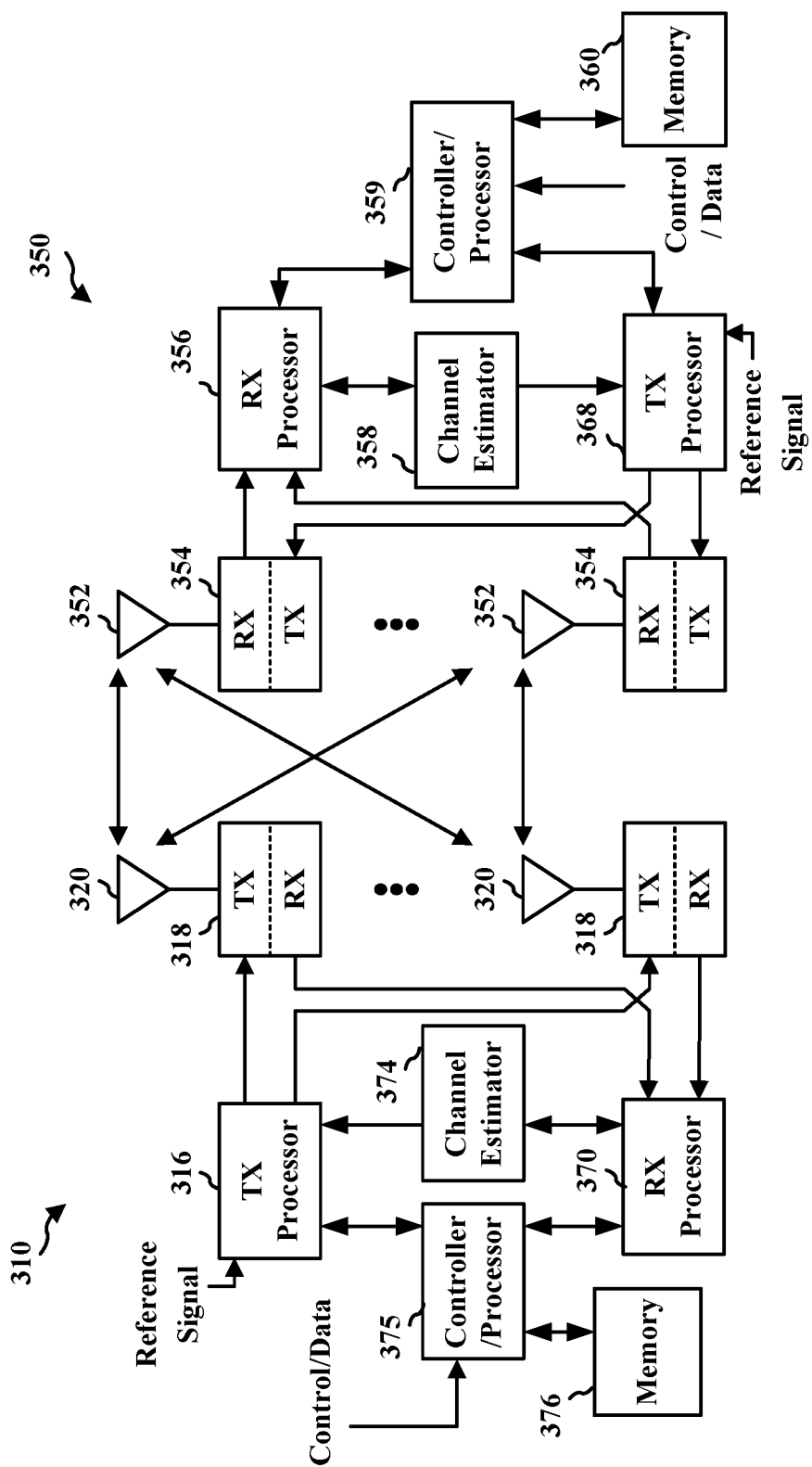
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the fast dormancy managing component 198 of FIG. 1.

A radio resource control (RRC) state may indicate whether a user equipment (UE) (e.g., an RRC layer of a UE) is logically connected to an RRC layer of a network (e.g., a base station). When an RRC connection is established between an RRC layer of the UE and an RRC layer of the network, the UE may be considered to be in an RRC connected state (e.g., RRC_CONNECTED) with the network. If the UE is not in an RRC connected state, the UE may be in an RRC idle state (e.g., RRC_IDLE). During the RRC connected state, the network may have some communication-related control over the UE.

In order to reduce power consumption at the UE and the use of wireless resources when there is no data activity, the network may decide to bring down or release the RRC connection between the UE and the network, such as after a period of inactivity. In some examples, the network may be in control of the dormancy procedure (e.g., releasing the RRC connection with the UE). For example, the network may be configured to initiate an inactivity timer when the network detects there is no data activity with the UE. Then, the network may initiate the dormancy procedure to release the RRC connection or to transition the UE to an RRC idle state when the inactivity timer expires. The network may initiate the dormancy procedure based on the inactivity timer without receiving/considering any input about dormancy from the UE. Different networks may be configured with different time periods/threshold for the inactivity timer. In other examples, a UE may have the capability to inform a network that the UE has no more data to transmit and/or receive. The network may use the information from the UE to bring down/release the RRC connection. The information from the UE may enable the network to terminate the RRC connection in advance of an expiration of the inactivity timer. The ability for a UE to provide information or input to the network to bring down/release the RRC connection may be referred to as support for "fast dormancy" or a "fast dormancy procedure" throughout the specification.

Figure 4:
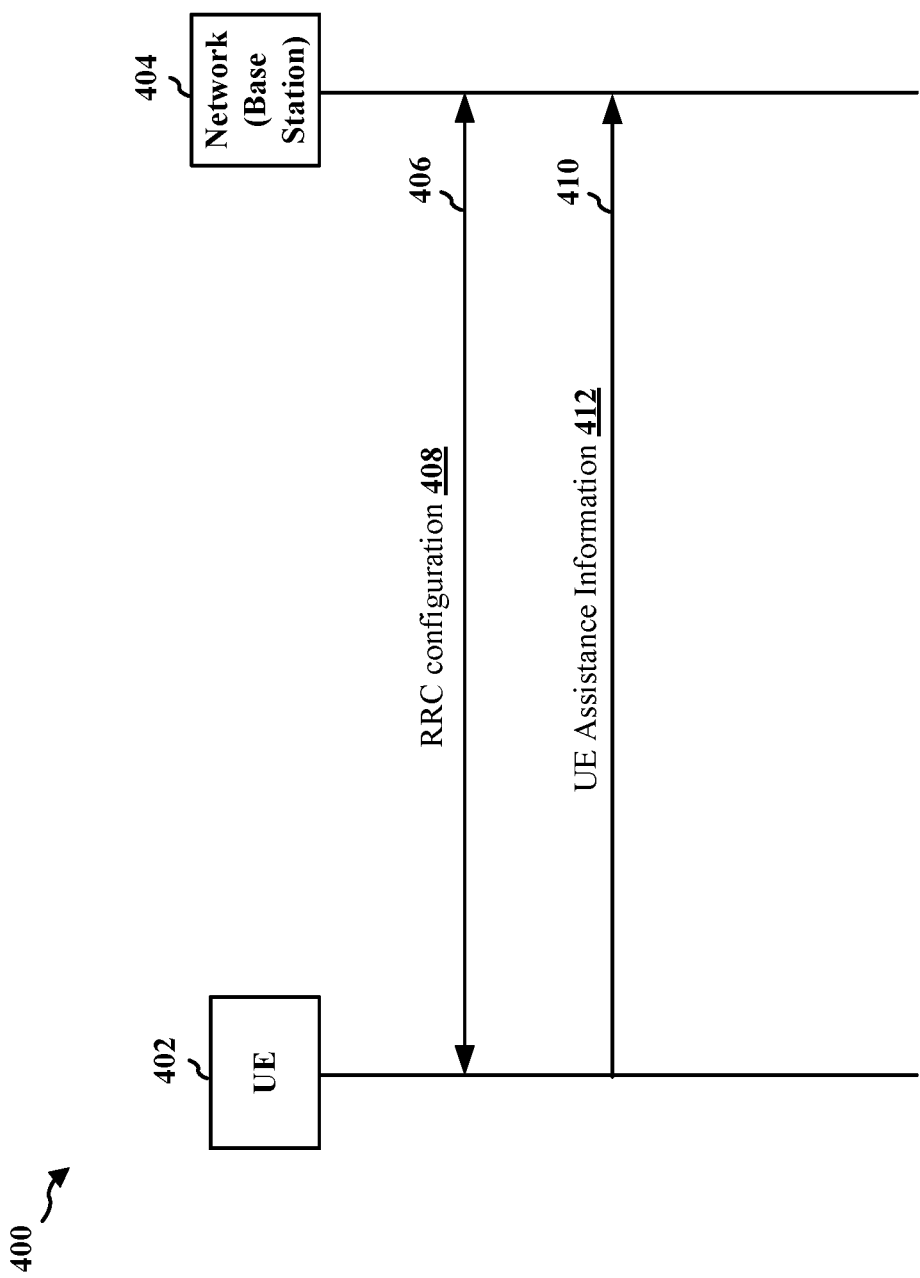
FIG. 4 is a communication flow illustrating an example of a fast dormancy procedure.

FIG. 4 is a communication flow 400 illustrating an example of a UE providing an indication to a network (e.g., a base station) for fast dormancy (or to indicate its power saving preference). At 406, a UE 402 may be RRC connected to a base station 404 (e.g., in an RRC_CONNECTED state), where the UE 402 and the base station 404 may exchange RRC reconfiguration messages 408 (or RRC connection reconfiguration messages) with each other to modify the RRC connection between them. For example, the base station 404 may use the RRC reconfiguration message 408 to establish/modify/release radio bearers, to perform handover (e.g., handing the UE 402 to another base station), to setup/modify/release channel measurements, and/or to add/modify/release second cell(s) for the UE 402, etc.

At 410, the UE 402 may transmit a UE assistance information message 412 (e.g., UE_AssistanceInfo) to the base station 404 to prompt the base station 404 to change one or more parameters and/or configurations for the UE 402 and/or for the communication between the UE 402 and the base station 404 (e.g., through the RRC reconfiguration), which may include prompting the base station 404 to initiate a fast dormancy procedure (e.g., releasing the RRC connection). For example, the UE 402 may use the UE assistance information message 412 to inform the base station 404 that the UE is ready to transition out of the RRC connection (e.g., an RRC_CONNECTED state), e.g., when the UE does not expect to send or receive data for at least a period of time. In other examples, the UE 402 may use the UE assistance information message 412 to inform the base station 404 of its delay budget report carrying desired increment/decrement in the connected mode DRX cycle length, its overheating assistance information, its IDC assistance information, its preference on DRX parameters for power saving, its preference on the maximum aggregated bandwidth for power saving, its preference on the maximum number of secondary component carriers for power saving, its preference on the maximum number of MIMO layers for power saving, its preference on the minimum scheduling offset for cross-slot scheduling for power saving, configured grant assistance information for NR sidelink communication, and/or its preference in being provisioned with reference time information, etc.

At 410, if the UE 402 has the capability to provide assistance information to transition out of the RRC connected state (e.g., the RRC_CONNECTED state), the UE 402 may provide the assistance information further based on being configured to do so, such as if the network indicates to the UE to provide the assistance information. Then, upon determining that the UE 402 prefers to transition out of the RRC connected state, or upon change of the UE 402's preferred RRC state, etc., the UE may transmit the UE assistance information 412 to the network. For example, the base station 404 may indicate to the UE 402 whether or not to provide UE assistance information 412 in the RRC configuration message 408. The UE may indicate its capability to provide such assistance information, and the network may configure the UE to provide the assistance information if the UE supports the capability. In some examples, the UE 402 may be configured to provide its release preference and a timer (e.g., a T346f timer) is not running; or if the UE 402 determines that it would prefer to transition out of the RRC connected state; or if the UE 402 is configured with connectedReporting and the UE determines that it would prefer to revert an earlier indication to transition out of the RRC connected state, etc. Then, the UE 402 may initiate transmission of the UE assistance information message 412 to provide the release preference to the base station 404.

In transmitting the UE assistance information message 412, the UE 402 may also set the contents of the UE assistance information message 412 if transmission of the UE assistance information message 412 is initiated to provide a release preference. In one example, the UE 402 may include a release preference (e.g., releasePreference) in the UE assistance information message 412. In another example, the UE 402 may indicate/set a preferred RRC state (e.g., preferredRRC-State) to the desired RRC state on transmission of the UE assistance information message 412.

Aspects presented herein may enable a UE (e.g., at upper layers of the UE) to determine when to transmit a UE assistance information to a network to transition out of the RRC connection more efficiently. For example, aspects presented herein provide improved methods and algorithms that may be implemented at the upper layers of a UE to assist the UE in determining when to inform a lower layer of the UE (e.g., an RRC layer) to send the release assistance information message (e.g., indication for RRC connection release) to the network. In other words, aspects presented herein may enable the upper layer of the UE to decide when to inform the RRC layer to proceed with sending the over-the-air (OTA) signaling message with UE assistance information (e.g., UE_AssistanceInfo) for its release preference. Aspects presented herein may enable a UE or a monitoring component/entity/module of the UE (e.g., a fast dormancy manager) to monitor one or more protocol data unit (PDU) activities that are associated with or established by one or more service entities, where each service entity may also be associated with or use one or more data network names (DNNs) for the PDU activities. The component may be comprised in a modem of the UE, for example. The component may determine whether the lower layer of the UE is to transmit the UE assistance information to the network for releasing the RRC connection based at least in part on the monitored PDU activities.

Figure 5:
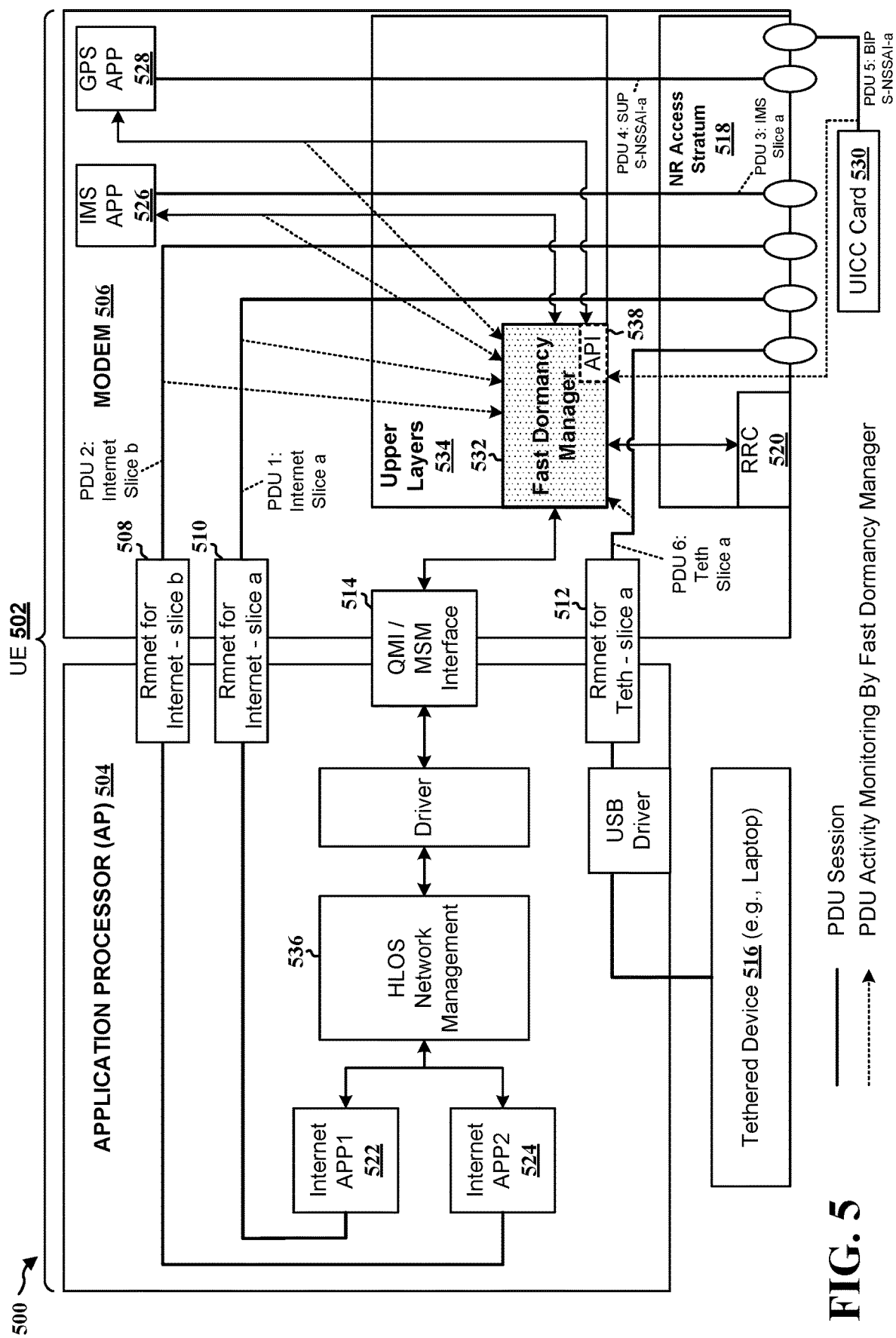
FIG. 5 is a diagram illustrating an example UE architecture.

FIG. 5 is a diagram 500 illustrating an example UE architecture. A UE 502 may include an application processor (AP) 504 and a modem 506 (e.g., a baseband modem). The UE 502 may also include cellular/Wi-Fi RF transceivers, antenna switch modules, power amplifier (PA) modules, near field communication (NFC) modules, a Bluetooth module, global navigation satellite system (GNSS) modules, PA management unit, static random-access memory (SRAM), and/or power management unit (PMU), etc.

The AP 504 may be a system on a chip (SoC) that is designed to support applications running on a mobile operating system environment, such as the internet applications 522, 524 (e.g., applications that have access to the internet), drivers (e.g., USB driver), high level operating system (HLOS) 536, memory management, graphics processing and/or multimedia decoding, etc. The modem 506 may enable the UE 502 to receive and transmit radio frequency signals from a base station and/or other wireless devices, such that the UE 502 may communicate with a network (e.g., the base station 404) through the modem 506, such as by establishing connections to external packet data networks PDNs. In one example, the modem 506 may include an access stratum (AS) 518 component/module (e.g., a 5G NR access stratum) which may serve as a functional layer (e.g., protocol stack) between the UE 502 and the network. For example, an access stratum protocol stack in a PC5 interface may include an RRC protocol (e.g., 520), a packet data convergence protocol (PDCP), a radio link control (RLC) protocol, a media access control (MAC) protocol, and/or a physical (PHY) protocol, etc. In another example, the modem 506 may also include an internet protocol (IP) multimedia subsystem (IMS) entity 526 and/or a global positioning system (GPS) entity 528. The IMS entity 526 and/or the GPS entity 528 may be embedded applications of the modem 506. The IMS entity 526 may be an architectural framework that enables the UE 502 to deliver multimedia communications services such as voice, video and/or text messaging over IP networks. The GPS entity 528 may be used to determine the geographic location of the UE 502.

In an aspect, the AP 504 may interact with the modem 506 through one or more network interfaces, such as via universal serial bus (USB) virtual Ethernet framework interface (e.g., rmnet interfaces 508, 510, 512) and/or a mobile station modems (MSM) interface 514 (e.g., a QMI interface), etc., where the AP 504 may communicate (e.g., transmit/receive) data (e.g., PDUs) with the modem 506 via the one or more network interfaces. The one or more network interfaces may enable applications processed/operated by the AP 504 to communicate with the data networks (e.g., through the AS 518). In another aspect, a tethered device 516, such as a tethered laptop or another tethered UE, etc., may also connect or have access to the modem 506 through the AP 504 (e.g., via the rmnet interface 512), such that the tethered device 516 may also have access to the data network.

A network may be sliced virtually into multiple slices through network slicing (e.g., 5G network slicing). Network slicing may enable multiple logical networks to run on top of a shared physical network infrastructure. In other words, network slicing may divide a single network connection into multiple distinct virtual connections that provide different amounts of resources to different types of traffic. As such, in some examples, each network interface (e.g., the rmnet interfaces 508, 510, 512) may be configured or associated with a network slice. For example, the AP 504 may include/ process a first internet application 522 and a second internet application 524. The first internet application 522 may be connected to the modem 506 and have access to the AS 518 through the rmnet interface 510 that is associated with a first slice of the network (e.g., internet slice a), and the second internet application 524 may be connected to the modem 506 and have access to the AS 518 through the rmnet interface 508 that is associated with a second slice of the network (e.g., internet slice b), etc.

A UE may receive network services through a PDU session, which may be a logical connection between the UE and a data network (DN). In other word, a PDU session may provide end-to-end user plane connectivity between the UE and a data network through a User Plane Function (UPF). A PDU session may support one or more quality of service (QoS) Flows. A UE may establish multiple PDU sessions to the same data network or to different data networks over a single or multiple access networks. For example, referring back to FIG. 5, the UE 502 may establish six (6) PDU sessions (e.g., PDU sessions 1-6) for six different service entities, such as for the tethered device 516, the first internet application 522, the second internet application 524, the IMS entity 526, the GPS entity 528 and a universal integrated circuit card (UICC) 530, etc.

In one aspect of the present disclosure, the UE 502 may include a monitoring module 532 that is configured to monitor one or more PDU sessions established by one or more service entities. For purpose of the present disclosure, the monitoring module 532 may be referred to as a "fast dormancy manager" throughout the specification. The name is merely used to illustrate the concept, and the manager or component that monitors the PDU sessions may also be referred to by other names. The monitoring module 532 may monitor the PDU activity for one or more PDU sessions, and determine whether one or more PDU sessions are active (e.g., whether there is still PDU transmission), inactive and/or idle for a period of time. Based at least in part on the monitoring status of the one or more PDU sessions, the UE 502 (e.g., an upper layer of the UE) may determine whether to transmit (e.g., via a lower layer) a UE assistance information to the network to request an RRC connection release, such as when there are no PDU activities for monitored PDU sessions. For example, the monitoring module 532 may determine a monitored PDU session has no PDU activity when the service entity associated with the monitored PDU session transmits a dormancy indication to the monitoring module 532 (e.g., through an API 538), a duration of inactivity in API for the service entity (i.e., a PDU inactive period indicated by the service entity) is larger than a threshold, and/or the accumulated inactivity cycles for the service entity has reached a threshold, etc.

The monitoring module 532 may be configured to reside at upper layers 534 of the modem 506 of the UE 502, and the monitoring module 532 may enable different entities such as the tethered device 516, the UICC 530 and/or the HLOS 536, etc. to signal the UE 502 to initiate the fast dormancy procedure. For example, while the monitoring module 532 may be capable of monitoring one or more PDU sessions established by one or more service entities, the monitoring module 532 may optionally provide an application interface (API) 538 for one or more PDU users, e.g., service entities that establish the PDU sessions such as the tethered device 516, the UICC 530, the IMS entities 526, etc. The API 538 may enable the one or more PDU users to provide information related to their PDU sessions/activities to the monitoring module 532. For example, one or more PDU users may indicate to the monitoring module 532 through the API 538 whether they have any PDU to transmit/receive in a period of time (e.g., next 15 seconds, 30 seconds, etc.), whether they want to continue or stop the PDU sessions, and/or whether they want to enter dormancy (e.g., by transmitting the dormancy indication), etc. For purpose of the present disclosure, a PDU user or a service entity transmitting an indication to the monitoring module 532 to indicate dormancy may be referred to as calling the dormancy API, call for dormancy and/or the dormancy API being called, etc. For example, when a GPS entity transmits a dormancy indication to the monitoring module 532, the GPS entity calls the dormancy API.

When the monitoring module 532 determines that there may be no PDU activities for a period of time based on the PDU session monitoring and/or the dormancy indication(s) from the one or more PDU users, the monitoring module 532 may indicate to the UE 502 (e.g., to a lower layer of the UE 502), to provide a UE assistance information to the network for an RRC connection release between the UE and the base station, such as described in connection with FIG. 4. For example, the monitoring module 532 may determine there are no PDU activities for one or more monitored PDU sessions when service entities associated with the PDU sessions have transmitted dormancy indication(s) to the monitoring module 532, have been inactive in API for a threshold, have indicated an inactive period that is larger than a threshold and/or have accumulated inactivity cycles that reach a threshold, etc.

The monitoring module 532 (i.e., the fast dormancy manager) may be configured to monitor one or more data connections (e.g., PDU sessions) that are associated with one or more DNNs on the UE 502 (e.g., a smart phone). For example, the monitoring module 532 may monitor the duration of inactivity in an API of and/or accumulated inactivity cycles for each data connection. In other words, the monitoring module 532 may consider several types of possible data connections (and DNNs) of a UE.

In one example, the monitoring module 532 may monitor a data connection (e.g., PDU session/activity) that is associated with an HLOS (e.g., 536) running on an AP (e.g., 504) and/or general internet applications (e.g., 522, 524) running over the AP, where the data connection may use, or may be associated with, an Internet DNN (e.g., DNN_Internet). In another example, the monitoring module 532 may monitor a data connection that is associated with an IMS (e.g., the IMS entity 526) running on a modem (e.g., 506) or an AP (e.g., 504), where the data connection may use, or may be associated with, an IMS DNN (e.g., DNN_IMS). In another example, the monitoring module 532 may monitor a data connection that is associated with a GPS running on a modem (e.g., 506) or an AP (e.g., 506), where the data connection may use, or may be associated with, a supplement (SUPL) DNN (e.g., DNN_SUPL) or an Internet DNN. In another example, the monitoring module 532 may monitor a data connection that is associated with one or more provisioning services such as a bearer independent protocol (BIP) for a UICC (e.g., 530), where the data connection may use, or may be associated with, an administration (ADMIN) DNN (e.g., DNN_Admin). In another example, the monitoring module 532 may monitor a data connection that is associated with one or more provisioning services such as an Open Mobile Alliance (OMA) device management (DM) (OMA-DM) running on an AP (e.g., 506), where the data connection may use, or may be associated with, an ADMIN DNN or an Internet DNN. In another example, the monitoring module 532 may monitor a data connection that is associated with one or more special applications running on one or more special DNNs, such as the multimedia messaging service (MMS), and/or operator special applications (e.g., DNN_OpAPP), etc. In another example, the monitoring module 532 may monitor data connection that is associated with one or more electronic devices (e.g., the tethered device 516; laptops or tablets) tethered via USB, Bluetooth and/or Wi-Fi, where the data connection may use or associated with a tethered DNN (e.g., DNN_teth) or an Internet DNN.

In another aspect of the present disclosure, the monitoring module 532 may be configured to monitor multiple network slices and/or multiple radio bearers associated with one or more data connections (e.g., PDU sessions). For example, as described in connection with the first internet application 522 and the second internet application 524, the monitoring module 532 may monitor a first PDU session established by the first internet application 522 that uses a first network slice or radio bearer and a second PDU session established by the second internet application 524 that uses a second network slice or radio bearer, etc. In other words, the monitoring module 532 may monitor one or more PDU sessions on multiple network slices. In addition, the monitoring module 532 may also one or more monitor PDU sessions on multiple radio bearers associated with multiple PDU sessions.

In another aspect of the present disclosure, as described previously, the monitoring module 532 may provide an API (e.g., 538) to one or more of the aforementioned service entities that are users/consumers of the PDU sessions, e.g., the IMS entity 526, the GPS entity 528, the BIP, the HLOS 536, the tethered device 516, etc. These entities may optionally call the API to declare data inactivity and the length of inactivity (e.g., calling dormancy API) if they have knowledge of them. For example, the monitoring module 532 may provide an optional API that has the capability to receive dormancy indication(s) (e.g., through a parameter such as go_dormant) from one or more of the aforementioned service entities. The dormancy indication may optionally or additionally include a duration of inactivity parameter, e.g., go_dormant (duration of inactivity) which indicates a duration in which there is no PDU activity for the service entity that transmits the dormancy indication. For example, the IMS entity 526 may transmit a dormancy indication to the monitoring module 532 to call for dormancy, where the dormancy indication may additionally indicate that the IMS entity 526 has no PDU activity for next X seconds/minutes.

In another aspect of the present disclosure, the monitoring module 532 may maintain a monitoring table/chart/record that is periodically updated (e.g., every X seconds/minutes). For example, as shown by an example monitoring table in Table 1 below, the monitoring module 532 may maintain a monitoring table that includes the name of a service entity (e.g., IMS, GPS), DNN used for the service entity (e.g., DNN_IMS, DNN_SUPL), whether the service entity has called dormancy API (e.g., transmitted the dormancy indication), the service entity's duration of inactivity in the API, and/or the service entity's accumulated inactivity cycles, etc.

TABLE 1

Example of a Monitoring Table

| Entity | DNN used | Dormancy API called | Duration of Inactivity in API | Accumulated inactivity cycles |
|---|---|---|---|---|
| IMS | DNN_IMS | Y | 30 sec | 0 |
| GPS | DNN_SUPL | Y | 60 sec | 0 |
| BIP | DNN_Admin | Y | — (not specified) | 3 |
| HLOS | DNN_Internet | N | N/A | 0 |
| Tethered device | DNN_teth | N | N/A | 1 |
| Operator App | DNN_OpApp | Y | — (not specified) | 2 |

The monitoring module 532 may determine whether to request an RRC connection release (e.g., through the RRC protocol 520) based at least in part on the table. For example, if the monitoring module 532 determines there are no PDU activities for service entities in the table as each service entity has called for dormancy, has indicated an inactivity period that is larger than a threshold or has reached a configured accumulated number of inactivity cycles, the monitoring module 532 may trigger/inform the UE 502 or the RRC protocol 520 to transmit the UE assistance information to the network for an RRC connection release request. The network may also be configured with a dormancy time NW_D (e.g., the inactivity timer), where the network may release the RRC connection when the dormancy time reaches a threshold after a period of PDU inactivity. The dormancy time NW_D may vary among networks, which may be 10 seconds, 15 seconds, 20 seconds, etc.

In another aspect of the present disclosure, for every PDU session p that is associated with a service entity and/or a DNN, the PDU session p may be configured with a number of activity check cycles n in the monitoring module 532 and optionally included in the monitoring table. The monitoring module 532 may determine whether PDU session p is inactive based on the number of activity check cycles n (e.g., when n reaches a threshold). In other words, the monitoring module 532 may have a preconfigured n[p] for a PDU p, to represent the number of activity check cycles specified for the PDU p to be considered inactive.

The monitoring module 532 may be configured with a fast dormancy time UE_D, which may be shorter than the network dormancy time NW_D (i.e., UE_D<NW_D). For example, if a network dormancy time NW_D is configured to be 20 seconds, the fast dormancy time NW_D may be configured to be 5 or 10 seconds, etc. In one example, as the monitoring module 532 may update the monitoring table every X seconds, the maximum fast dormancy time UE_D may be configured to be n*X. For example, if the monitoring table is updated every five seconds (e.g., X=5 seconds) and the number of activity check cycles n for a PDU session p is three (e.g., n=3), then the maximum fast dormancy time UE_D may be 15 seconds (e.g., 5*3=15).

In another aspect of the present disclosure, a minimum future inactivity duration (e.g., min_future_inact_duration) may be configured/defined for the monitoring module 532, and the monitoring module 532 may provide API for PDU clients of upper layers to go dormant. In other words, the API may enable a PDU client to transmit a dormancy indication to the monitoring module 532 to indicate that the PDU client is calling for dormancy. PDU clients may refer to service entities and DNNs that establish PDU sessions, e.g., the IMS entity 526, the GPS entity 528, the BIP, the HLOS 536, the tethered device 516, etc.

Figure 6:
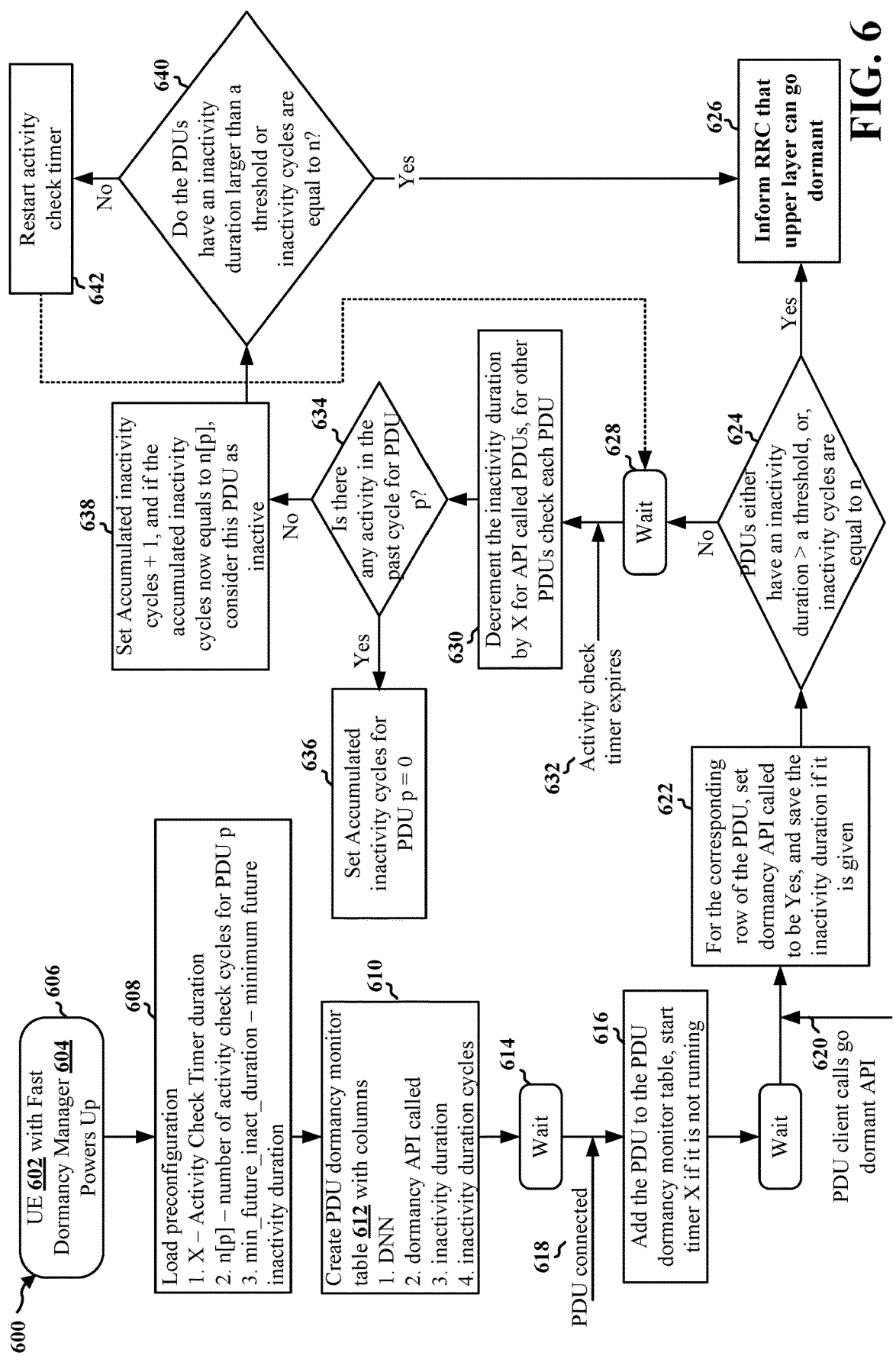
FIG. 6 is a flow chart illustrating an example algorithm performed by a fast dormancy manager according to aspects of the present disclosure.

FIG. 6 is a flow chart 600 illustrating an example algorithm that may be performed by a fast dormancy manager (i.e., the monitoring module 532) at upper level of a UE (e.g., the UE 502). At 606, a UE 602 that includes or is configured with a fast dormancy manager 604 may be powered up, such as when the UE 602 is switched on or when the fast dormancy manager 604 is loaded or triggered. The fast dormancy manager 604 may reside at the upper layers of a modem of the UE 602.

At 608, after the power up, the fast dormancy manager 604 may load one or more configurations and/or parameters related to PDU session monitoring, where the fast dormancy manager 604 may determine whether a PDU session p is active or inactive based at least in part on one or more of the configurations and/or parameters. The one or more configurations and/or parameters may include an activity check timer duration X (e.g., seconds, minutes), which may be the same as the period in which a monitoring table is updated. In other words, in every X seconds/minutes, the fast dormancy manager 604 may check the status of PDU sessions monitored by the fast dormancy manager 604.

The one or more configurations and/or parameters may include a number of activity check cycles n for PDU session p, which may be represented by n[p]. Different PDU sessions may have different number of activity check cycles. For example, a PDU session associated with an IMS entity (e.g., 526) may be configured with two (2) activity check cycles, a PDU session associated with a tethered device (e.g., 516) may be configured with three (3) activity check cycles, and a PDU session associated with an internet application (e.g., 522 or 524) may be configured with five (5) activity check cycles etc. The fast dormancy manager 604 may consider a PDU session p is inactive or ready to go dormant when an accumulated number of inactivity cycles for the PDU session p reaches the configured activity check cycles. For example, when the PDU session associated with the internet application has accumulated five inactivity cycles, the fast dormancy manager 604 may consider the internet application is inactive or ready to go dormant. In other example, when the PDU session associated with the IMS entity has accumulated two inactivity cycles, the fast dormancy manager 604 may consider the IMS entity is inactive or ready to go dormant.

The one or more configurations and/or parameters may also include a minimum future inactivity duration (e.g., min_future_inact_duration). When a service entity transmits a dormancy indication to the fast dormancy manager 604 (e.g., through an API provided by the fast dormancy manager 604), the dormancy indication may include a future inactivity duration that specifies a duration in which the service entity may remain inactive (e.g., not transmitting/receiving PDUs or establishing a PDU session). For example, the tethered device may transmit a dormancy indication including a future inactivity duration of 45 seconds to the fast dormancy manager 604, which may inform the fast dormancy manager 604 that the tethered device is willing to go dormant and/or has no PDU activities for next 45 seconds. When the future inactivity duration indicated by a service entity is greater than the minimum future inactivity duration configured for the fast dormancy manager 604, the fast dormancy manager 604 may consider the service entity or the PDU session associated with the service entity to be inactive. For example, if the minimum future inactivity duration is configured to be 10 seconds and the tethered device transmit a dormancy indication including a future inactivity duration of 15 seconds to the fast dormancy manager 604, the fast dormancy manager 604 may consider the tethered device to be inactive. As such, when all PDU sessions or service entities have transmitted a dormancy indication that includes a future inactivity duration larger than the minimum future inactivity duration configured for the fast dormancy manager 604, the fast dormancy manager 604 may consider all PDU sessions or service entities are willing to go dormant, and the fast dormancy manager 604 may inform the UE 602 (e.g., lower layers of the UE 602) to send a UE assistance information message (e.g., 412) to the network to request an RRC connection release. The minimum future inactivity duration may be tuned based on the network used, such that the fast dormancy manager 604 may configure different minimum future inactivity duration for different networks.

At 610, as described in connection with Table 1, the fast dormancy manager 604 may create or maintain a PDU dormancy monitor table 612 to assist the fast dormancy manager 604 to determine one or more service entities to be monitored and to track the PDU activities of the one or more services entities. The PDU dormancy monitor table 612 may be updated periodically, such as every X seconds/minutes as indicated by the activity check timer duration. While examples in Table 1 and FIG. 6 use a table as illustration, note that the fast dormancy manager 604 may monitor the PDU activities without a table, or the fast dormancy manager 604 may monitor the PDU activities using other recording or tracking means/mechanisms, such as based on a chart or a record instead. Thus, the use of the table is merely for illustration purposes and shall not be construed to limit the scope of the present disclosure.

In one example, as shown by Table 1, as the fast dormancy manager 604 may determine whether a service entity or its associated DNN has an active or an inactive PDU session based at least in part on whether the service entity has called the dormancy, whether the inactivity duration for the service entity is greater than a threshold, and/or whether the service has accumulated a threshold of inactivity cycles, the PDU dormancy monitor table 612 may include columns that show DNN, dormancy API calling status, indicated inactivity duration, and/or accumulated inactivity duration cycles associated with each service entity. For example, based on Table 1, the fast dormancy manager 604 may know that the IMS entity uses DNN_IMS for a PDU session, the IMS entity has called the dormancy (e.g., dormancy API called=Y), the IMS entity has indicated thirty (30) seconds of inactivity, etc. In one configuration, the PDU dormancy monitor table 612 may optionally be loaded with a list of service entities that are to be monitored for their PDU activities. For example, as shown by Table 1, the PDU dormancy monitor table 612 or the fast dormancy manager 604 may be specified to monitor the PDU activities of the IMS entity, the GPS entity, the BIP, the HLOS, the tethered device and the operator application (e.g., a fixed list of service entities). In another configuration, the fast dormancy manager 604 may add a PDU session or its associated service entity to the PDU dormancy monitor table 612 when the fast dormancy manager 604 detects that a PDU session is established or connected. In other words, the service entities that are to be monitored may vary (e.g., the service entity list is not fixed).

At 614, after the one or more configurations and/or parameters related to PDU monitoring are loaded (e.g., at 608) and optionally after the PDU dormancy monitor table 612 is created, the fast dormancy manager 604 may wait for one or more PDU sessions to be connected/established.

At 616, when a PDU session is established by a service entity (which may also be referred to as a "PDU client") as shown at 618, the fast dormancy manager 604 may start monitor the PDU session or the service entity associated with the PDU session, such as by adding the PDU session/service entity into the PDU dormancy monitor table 612. The fast dormancy manager 604 may also start an activity timer that has the activity check timer duration of X (e.g., configured at 608) if the activity timer has not started. If the activity timer is already running, the fast dormancy manager 604 may start monitoring the newly connected PDU sessions based on the running activity timer.

At 620, one or more service entities may explicitly indicate to the fast dormancy manager 604 about its willingness to go dormant, such as by transmitting a dormancy indication to the fast dormancy manager 604. As described previously, the dormancy indication may optionally include a future inactivity duration, which indicates a duration in which the service entity does not have an active PDU activity.

At 622, in response to the dormancy indication(s) received from one or more service entities, the fast dormancy manager 604 may update the PDU dormancy monitor table 612 to record the dormancy indication status for the associated service entities. For example, for the corresponding row of the service entity, the fast dormancy manager 604 may set the "Dormancy API called" column to yes, and may also save the future inactivity duration if it is indicated by the one or more service entities. For example, as shown by Table 1, the IMS entity may transmit a dormancy indication to the fast dormancy manager 604 through the API, and the dormancy indication may include a future inactivity duration of 30 seconds. In response, the fast dormancy manager 604 may update the information/row of the IMS entity in the PDU dormancy monitor table 612, such as by setting the "Dormancy API called" field to Y (e.g., yes) and updated the "Duration of Inactivity in API." Similarly, the operator application (e.g., Operator App) may also transmit a dormancy indication to the fast dormancy manager 604 through the API but the dormancy indication may not have included a future inactivity duration. In response, the fast dormancy manager 604 may update the information/row of the operator application in the PDU dormancy monitor table 612, such as by setting the "Dormancy API called" field to Y (e.g., yes). As the operator application does not provide a future inactivity duration in the dormancy indication, the "Duration of Inactivity in API" field may be empty for the operator application in the PDU dormancy monitor table 612, or there may be an indication explicitly indicating that the future inactivity duration has not been provided by the operator application (e.g., an indication of "not specified," "not available," "not provided," etc.).

At 624, the fast dormancy manager 604 may check whether all monitored PDU sessions are either having a future inactivity duration larger than the minimum future inactivity duration (e.g., configured at 608) or the accumulated inactivity cycles for the PDU sessions are equal to their respective number of activity check cycles configured at 608 (e.g., the accumulated inactivity cycle of PDU session p=n[p]).

When all monitored PDU sessions either have a future inactivity duration larger than the minimum future inactivity duration or the accumulated inactivity cycles for the PDU sessions are equal to their respective number of activity check cycles, the fast dormancy manager 604 may determine that there are no active PDU activities for the monitored service entities, and the fast dormancy manager 604 may inform the RRC protocol (e.g., 520) or lower layers of the UE 602 that upper layers may go dormant or are ready to go dormant, such as shown at 626. For example, the UE 602 may transmit a UE assistance information to the network to request the network for an RRC connection release.

On the other hand, if one or more monitored PDU sessions do not have a future inactivity duration larger than the minimum future inactivity duration and the accumulated inactivity cycles for the one or more PDU sessions have not reached to their respective number of activity check cycles, the fast dormancy manager 604 may wait and continue to operate, e.g., continuing the activity check timer and updating the PDU dormancy monitor table 612, such as shown at 628.

At 630, when the activity check timer with duration X expires, such as shown at 632, the fast dormancy manager 604 may decrement the future inactivity duration for service entities that have transmitted the dormancy indication including the future inactivity duration by X. For example, if the activity check timer duration X is configured to be five seconds (e.g., X=5) and the IMS entity has transmitted a dormancy indication including a future inactivity duration of thirty (30) seconds, the fast dormancy manager 604 may decrease the future inactivity duration of the IMS entity to 25 seconds (e.g., 30−5=25). The fast dormancy manager 604 may also update the PDU dormancy monitor table 612 accordingly. If a service entity's future inactivity duration becomes zero (0) or below after the decrease, the fast dormancy manager 604 may change the dormancy indication status of the service entity from Yes to No. For example, the fast dormancy manager 604 may update the "dormancy API called" column of the service entity to be N, and restart monitor the PDU activity associated with the service entity (e.g., as if the service entity has not called the dormancy API at 620). In other words, the fast dormancy manager 604 may check the current inactivity duration M for all service entities that have called dormancy and included the future inactivity duration. If M<min_future_inact_duration, the fast dormancy manager 604 may keep updating the PDU dormancy monitor table 612, and may not go dormant. However, if M>min_future_inact_duration, the fast dormancy manager 604 may inform RRC that upper layers are ready to go dormant, as shown at 626.

At 634, for one or more service entities that have not called the dormancy (e.g., have not transmitted a dormancy indication) or their "dormancy API called" status has been updated to No (e.g., their current future inactivity duration M is smaller than the minimum future inactivity duration), the fast dormancy manager 604 may check each of their associated PDU activity (e.g., their associated PDU sessions). For example, for a PDU session p that has not called the dormancy, the fast dormancy manager 604 may check whether there is any PDU activity (e.g., PDU transmission/reception) for the PDU session p in the past cycle (e.g., the activity check timer duration X). If the fast dormancy manager 604 detects PDU activity for the PDU session p in the past cycle, as shown at 636, the fast dormancy manager 604 may set or reset the accumulated inactivity cycles for the PDU session p to zero (0). However, if the fast dormancy manager 604 does not detect any PDU activity for the PDU session p in the past cycle, as shown at 638, the fast dormancy manager 604 may increase the accumulated inactivity cycles of the PDU session p by one (1), and if the accumulated inactivity cycles now equals to n[p] for the PDU session p, the fast dormancy manager 604 may consider the PDU session p to be inactive.

For example, at 634, the fast dormancy manager 604 may check the PDU activity of a tethered device (e.g., 516) which has not called for the dormancy (e.g., has not transmitted a dormancy indication to the fast dormancy manager 604) and has an accumulated inactivity cycles of one (1). If the fast dormancy manager 604 detects there are PDU activities for the tethered device in the past cycle (e.g., in the last X seconds), at 636, the fast dormancy manager 604 may set or reset the accumulated inactivity cycles of the tethered device to zero (0). Conversely, if the fast dormancy manager 604 detects there are no PDU activities for the tethered device in the past cycle (e.g., in the last X seconds), at 638, the fast dormancy manager 604 may increment the accumulated inactivity cycles of the tethered device to by one (1), such that the accumulated inactivity cycles of the tethered device is now equal to two (2). If the configured number of activity check cycles n[p] is also equal to two, the fast dormancy manager 604 may consider the tethered device or the PDU session associated with the tether device as inactive. If the configured number of activity check cycles n[p] is still higher than the accumulated inactivity cycles, then the fast dormancy manager 604 may not consider the tethered device or the PDU session associated with the tether device as inactive.

At 640, similar to 624, after checking the PDU activities for service entities or their associated PDU sessions that have not called the dormancy, the fast dormancy manager 604 may check whether all monitored PDU sessions either have a future inactivity duration larger than a threshold (e.g., the minimum future inactivity duration) or that the accumulated inactivity cycles for the PDU sessions are equal to their respective number of activity check cycles n[p]. When all monitored PDU sessions meet either one of these two conditions, the fast dormancy manager 604 may determine that there are no active PDU activities for the monitored service entities, and the fast dormancy manager 604 may inform the RRC protocol or lower layers of the UE 602 that upper layers may go dormant or are ready to go dormant, such as shown at 626. In response, the UE 602 may transmit a UE assistance information to the network to request the network for an RRC connection release.

On the other hand, if one or more monitored PDU sessions do not have a future inactivity duration larger than the minimum future inactivity duration and the accumulated inactivity cycles for the one or more PDU sessions have not reached to their respective number of activity check cycles n[p], as shown at 642, the fast dormancy manager 604 may restart the activity check timer and repeat steps 628 to 640.

In other words, when some service entities have called the API and some have not (or none have called the API), for those service entities who have not called the API, the fast dormancy manager 604 may look at the statistics of those service entities in previous cycle to see if any PDU activity happened. If no PDU activity happened, the fast dormancy manager 604 may add one count in to their associated accumulated inactivity cycles column. If there is PDU activity, the fast dormancy manager 604 may clear the accumulated inactivity cycles to be zero (0). For those entities who have called the API, the fast dormancy manager 604 may decrement their associated inactivity time when timer X expires. If all entities who have not called the API, the corresponding accumulated inactivity cycles are equal to the "n[p]" of that PDU session (e.g., configured at 608), and for the entities who called the API, the inactivity duration is larger than min_future_inact_duration, the fast dormancy manager 604 may inform RRC to go dormant.

Figure 7:
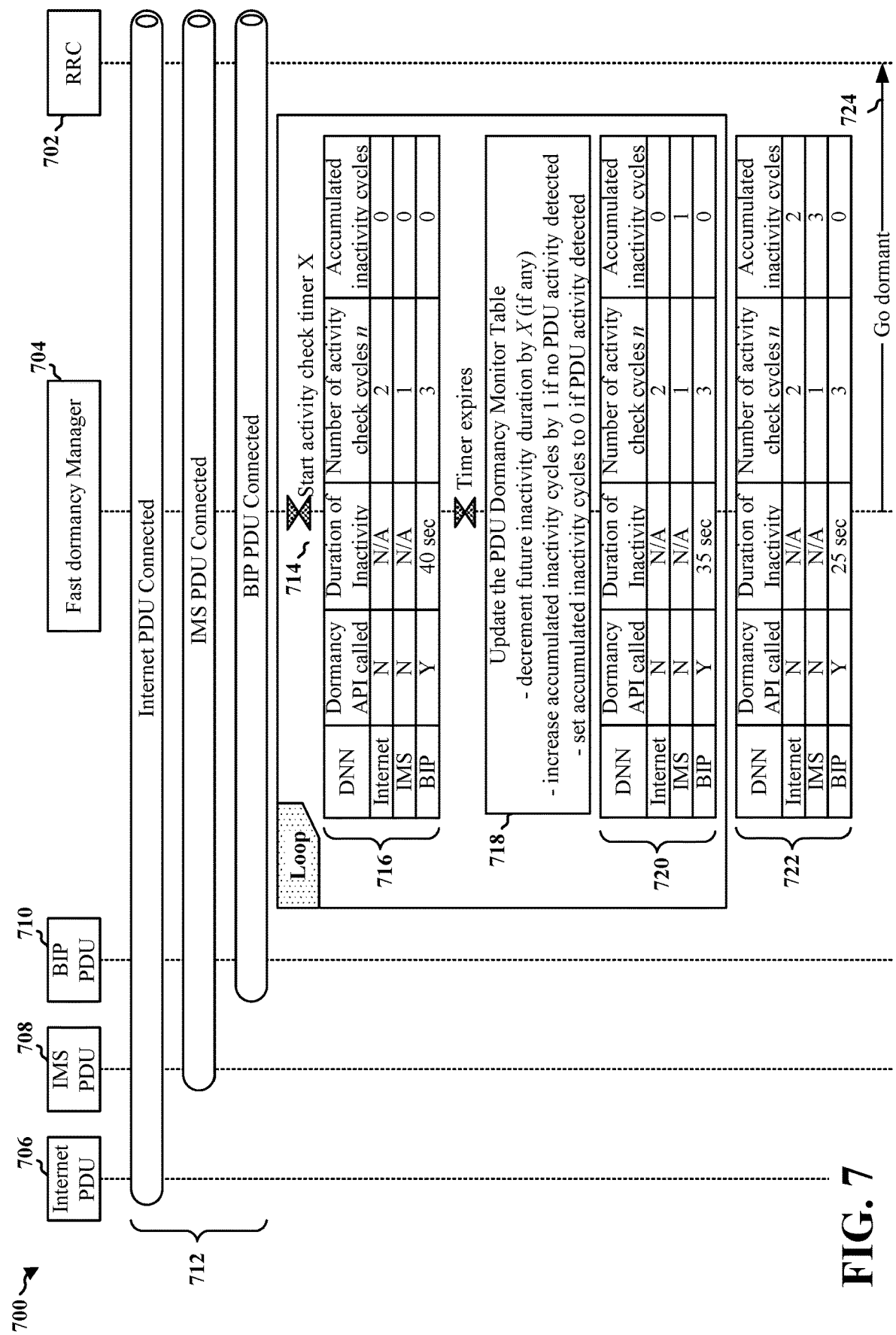
FIG. 7 is a communication flow illustrating an example operation of a fast dormancy manager according to aspects of the present disclosure.

FIG. 7 is a communication flow 700 illustrating an example operation of a fast dormancy manager according to aspects of the present disclosure. At 712, a fast dormancy manager 704 (e.g., 532, 604) may be configured to monitor PDU activities for an internet PDU 706 (e.g., a PDU session associated with an internet application), an IMS PDU 708 (e.g., a PDU session associated with an IMS entity), and a BIP PDU 710 (e.g., a PDU session associated with a BIP), such as described in connection with 616 and 618 of FIG. 6. The internet PDU 706 may be associated with an internet DNN, and may be configured with an activity check cycles of two (e.g., n for the internet PDU 706=2). The IMS PDU 708 may be associated with an IMS DNN, and may be configured with an activity check cycles of 1 (e.g., n for the IMS PDU 706=1). The BIP PDU 710 may be associated with a BIP DNN, and may be configured with an activity check cycles of 3 (e.g., n for the IMS PDU 706=3). The BIP PDU 710 may have transmitted a dormancy indication to the fast dormancy manager 704 (i.e., have called the dormancy API), and the dormancy indication may include a future inactivity duration of 40 seconds. In addition, the fast dormancy manager 704 may be configured with a minimum future inactivity duration of 10 seconds (e.g., min_future_inact_duration=10 seconds) and an activity check timer duration of five seconds (e.g., X=5), such as described in connection with 608 of FIG. 6.

In some examples, as described in connection with 608 of FIG. 6, the fast dormancy manager 704 may create and/or maintain a PDU dormancy monitor table (e.g., 612), such as shown by Table 2 below. The PDU dormancy monitor table may keep track of DNNs that are associated with the PDU sessions (e.g., the internet PDU 706, the IMS PDU 708, the BIP PDU 710, etc.) and their respective dormancy API calling status (e.g., whether they have called dormancy API), their duration of inactivity in API, their configured number of activity check cycles n and/or their accumulated inactivity cycles, etc. For example, as the internet PDU 706 has not called the dormancy API and is configured with an activity check cycles of two (e.g., n=2), the row associated with the internet PDU 706 may show the "dormancy API called" status as "N", the "duration of inactivity in API" as "N/A", the "number of activity check cycles n" as "2", and the current "accumulated inactivity cycle" as "0". Similarly, as the BIP PDU 710 has called the dormancy API and indicated a duration of inactivity of 40 seconds, and the BIP PDU 710 is configured with an activity check cycles of two (e.g., n=2), the row associated with the BIP PDU 710 may show the "dormancy API called" status as "Y", the "duration of inactivity in API" as "40 Sec", the "number of activity check cycles n" as "3", and the current "accumulated inactivity cycle" as "0", etc.

TABLE 2

Example PDU Dormancy Monitor Table for FIG. 7

| DNN | Dormancy API called | Duration of Inactivity in API | Number of activity check cycles n | Accumulated inactivity cycles |
| --- | --- | --- | --- | --- |
| Internet | N | N/A | 2 | 0 |
| IMS | N | N/A | 1 | 0 |
| BIP | Y | 40 Sec | 3 | 0 |

At 714, after the internet PDU 706, the IMS PDU 708, and the BIP PDU 710 are connected with and monitored by the fast dormancy manager 704, the fast dormancy manager 704 may initiate an activity check timer with a duration X, such as described in connection with 616 of FIG. 6.

At 716, the fast dormancy manager 704 may create or maintain a table as shown by Table 2, where the table may keep PDU related status, activities and/or parameters for the monitored PDUs.

At 718, after the activity check timer expires (e.g., after the duration X), as described in connection with 630 to 640 of FIG. 6, the fast dormancy manager 704 may check the PDU activity for DNNs/PDUs that have not called the dormancy API and DNNs/PDUs that have called the dormancy API but their duration of inactivity have reaches zero or below (i.e., the "dormancy API called" field for these DNNs/PDUs is "N" or "No") or is unavailable (e.g., indicated as "N/A"), and the fast dormancy manager 704 may also check the duration of inactivity for DNNs/PDUs that have called dormancy and indicated the duration of inactivity. Then, the fast dormancy manager 704 may update the PDU dormancy monitor table accordingly.

As described in connection with 630 of FIG. 6, the fast dormancy manager 704 may decrement the future inactivity duration for PDUs that have called for the dormancy and indicated the duration of inactivity by X. For example, as the activity check timer duration X is configured to be five seconds (e.g., X=5) and the BIP PDU 710 has called the dormancy API and indicated a duration of inactivity to be forty (40) seconds, the fast dormancy manager 704 may decrease the duration of inactivity of the BIP PDU 710 to 35 seconds (e.g., 40−5=35). If a PDU's duration of inactivity becomes zero or below after the decrease, the fast dormancy manager 704 may change the dormancy indication status of the PDU from Yes/Y to No/N.

As described in connection with 634 of FIG. 6, At 634, for DNNs/PDUs that have not called the dormancy API and DNNs/PDUs that have called the dormancy API but their duration of inactivity has reaches zero or below or is unavailable, the fast dormancy manager 704 may check their associated PDU activity in the past cycle (e.g., the past duration X). If PDU activity is detected for a DNN/PDU, then the accumulated inactivity cycle for that DNN/PDU is set to zero (0). Otherwise if no PDU activity is detected for a DNN/PDU, the accumulated inactivity cycle for that DNN/PDU is increased by one (1).

For example, as shown at 720, the fast dormancy manager 704 may detect PDU activity for the internet PDU 706 but not for the IMS PDU 708. Thus, the fast dormancy manager 704 may increase the accumulated inactivity cycles for the IMS PDU 708 by one (e.g., from 0 to 1), and the accumulated inactivity cycles for the internet PDU 706 may remain zero or set to zero. The fast dormancy manager 704 may also decrease the duration of inactivity of the BIP PDU 710 to 35 seconds.

After the PDU dormancy monitor table is updated at 718, if there is one or more PDUs that do not have a duration of inactivity larger than min_future_inact_duration (e.g., 10 seconds) and their inactivity cycles have not accumulated to n or greater than n, the fast dormancy manager 704 may restart the activity check timer, and the steps 714 and 718 are repeated, where the PDU dormancy monitor table is updated every duration X. For example, as shown by the PDU dormancy monitor table at 720, as not all PDUs have a duration of inactivity larger than min_future_inact_duration or their inactivity cycles have accumulated to n or greater than n, the fast dormancy manager 704 may restart the activity check timer and repeat steps 714 and 718.

On the other hand, as shown at 722, if after the PDU dormancy monitor table is updated and the fast dormancy manager 704 determines that all PDUs are either having a duration of inactivity larger than min_future_inact_duration (e.g., the duration of inactivity for the BIP PDU 710 is greater than 10 seconds) or their inactivity cycles are equal to or greater than n (e.g., the accumulated activity cycle for internet PDU 706 is equals to its configured n and the accumulated activity cycle for the IMS PDU 708 is greater than its configured n), at 724, the fast dormancy manager 704 may notify an RRC protocol 702 of the UE that the upper layers are ready to go dormant, such as described in connection with 626 of FIG. 6.

Figure 8:
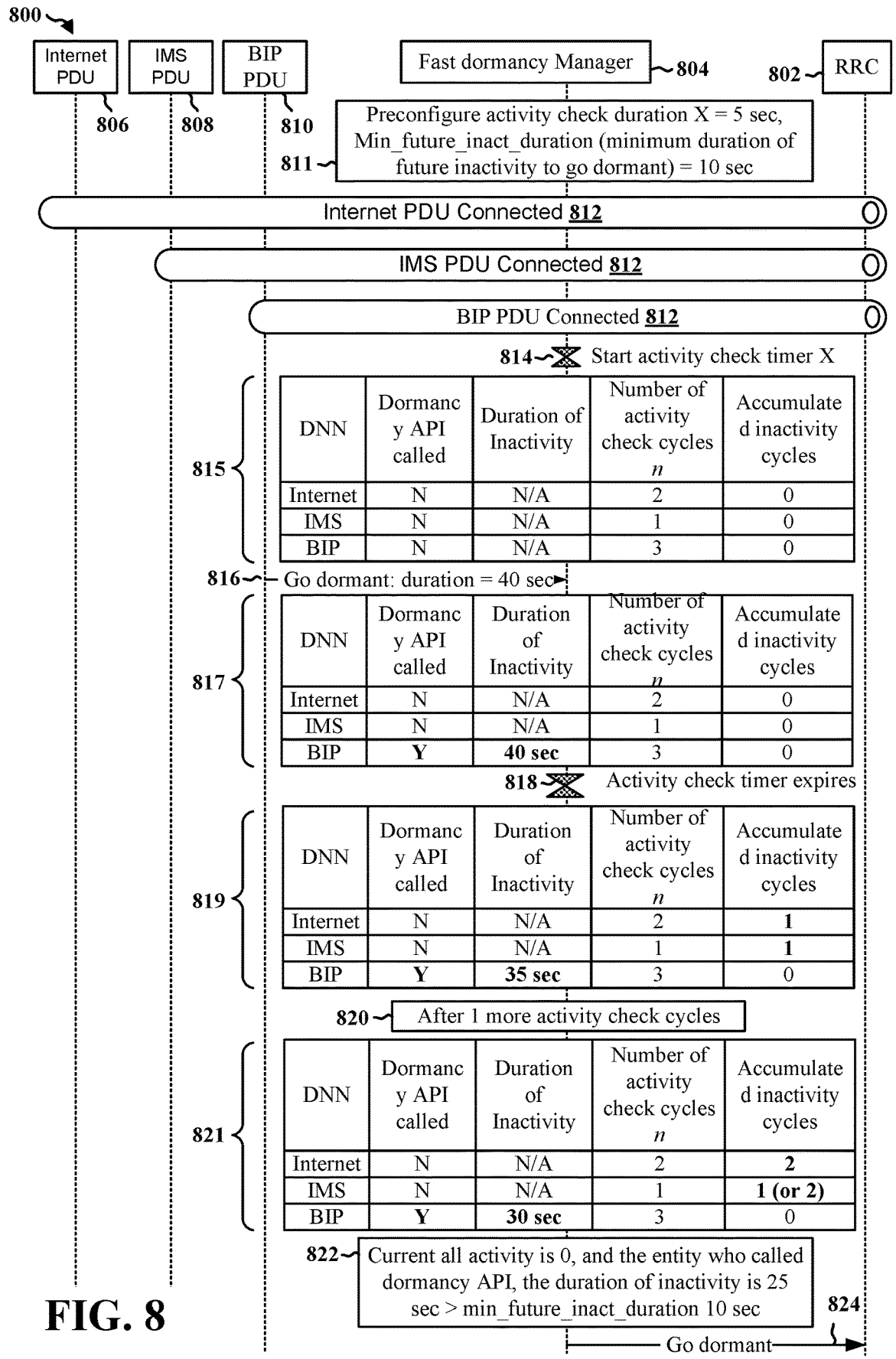
FIG. 8 is a communication flow illustrating an example operation of a fast dormancy manager according to aspects of the present disclosure.

FIG. 8 is a communication flow 800 illustrating an example operation of a fast dormancy manager according to aspects of the present disclosure. At 811, as described in connection with 608 of FIG. 6, a fast dormancy manager 804 may load one or more configurations and/or parameters (e.g., after power up) that are associated with one or more PDUs, where the fast dormancy manager 804 may determine whether a PDU p is active/inactive based at least in part on the one or more configurations and/or parameters. The one or more configurations and/or parameters may include an activity check timer duration of five seconds (e.g., X=5 seconds) and a minimum duration of future inactivity of ten seconds (e.g., min_future_inact_duration=10 seconds).

At 812, the fast dormancy manager 804 may be configured to monitor PDU activities for an internet PDU 806, an IMS PDU 808, and a BIP PDU 810, such as described in connection with 616 and 618 of FIG. 6. The internet PDU 806 may be associated with an internet DNN, and may be configured with an activity check cycles of two (e.g., n=2 for the internet PDU 806). The IMS PDU 808 may be associated with an IMS DNN, and may be configured with an activity check cycles of 1 (e.g., n=1 for the IMS PDU 806). The BIP PDU 810 may be associated with a BIP DNN, and may be configured with an activity check cycles of 3 (e.g., n=3 for the IMS PDU 806).

At 814, after the internet PDU 806, the IMS PDU 808, and the BIP PDU 810 are connected with and monitored by the fast dormancy manager 804, the fast dormancy manager 804 may initiate an activity check timer with a duration of five seconds, such as described in connection with 616 of FIG. 6.

At 815, after the activity check timer is activated, the fast dormancy manager 804 may maintain a PDU dormancy monitor table (e.g., 612), such as shown at 815. The PDU dormancy monitor table may keep track of PDU activities for the connected PDUs (e.g., the internet PDU 806, the IMS PDU 808, the BIP PDU 810, etc.), such as their dormancy API calling status, duration of inactivity, number of activity check cycles n and/or accumulated inactivity cycles, etc. For example, as none of the PDUs have called the dormancy API at 815, the "dormancy API called" status for all PDUs are indicated as "N" and the "duration of inactivity" field is indicated as "N/A." The accumulated inactivity cycles for all PDUs may also be set to zero initially. On the other hand, as the number of activity check cycles for all PDUs may be configured for the fast dormancy manager 804 (e.g., at 811 or 812), the "number of activity check cycles n" field for the internet PDU 806, the IMS PDU 808 and the BIP PDU 810 may be set to 2, 1 and 3 respectively.

At 816, the BIP PDU 810 may transmit a dormancy indication to the fast dormancy manager 804 (i.e., called the dormancy API), and the dormancy indication may include a duration of inactivity=40 seconds.

At 817, the fast dormancy manager 804 may update the PDU dormancy monitor table, where the "dormancy API called" status for the BIP PDU 810 is updated from "N" to "Y," and the "duration of inactivity" field is updated from "N/A" to "40 seconds."

At 818, after the activity check timer expires (e.g., after five seconds), as described in connection with 630 to 640 of FIG. 6, the fast dormancy manager 804 may check the PDU activity for PDUs that have not called the dormancy API (e.g., the "dormancy API called" status is "N"), and the fast dormancy manager 804 may also check the duration of inactivity for DNNs that have called the dormancy API. Then, the fast dormancy manager 804 may update the PDU dormancy monitor table accordingly.

At 819, if the fast dormancy manager 804 does not detect any PDU activities for the PDUs that have not called the dormancy API in the past cycle (e.g., from 814 to 818), the fast dormancy manager 804 may increment their accumulated inactivity cycles by one. For example, if the fast dormancy manager 804 does not detect any PDU activities for the internet PDU 806 and the IMS PDU 808, the fast dormancy manager 804 may increase their accumulated inactivity cycles from zero (0) to one (1). For PDUs that have called the dormancy API and included a duration of inactivity, the fast dormancy manager 804 may decrease their duration of inactivity by the cycle duration (e.g., duration X). For example, the fast dormancy manager 804 may decrease the duration of inactivity of the BIP PDU 810 from 40 seconds to 35 seconds.

After the PDU dormancy monitor table is updated, if there is one or more PDUs that do not have a duration of inactivity larger than min_future_inact_duration (e.g., 10 seconds) and their inactivity cycles have not accumulated to n or greater than n, the fast dormancy manager 804 may restart the activity check timer, and the steps 818 and 819 may be repeated, where the PDU dormancy monitor table is updated again after duration X (e.g., five seconds). For example, as shown by the PDU dormancy monitor table at 819, as not all PDUs have a duration of inactivity larger than min_future_inact_duration or their inactivity cycles have accumulated to n or greater than n, at 820, the fast dormancy manager 804 may restart the activity check timer and repeat steps 818 and 819.

After running one more activity check cycle at 820, as shown at 821, if the fast dormancy manager 804 again does not detect any PDU activities for the internet PDU 806 and the IMS PDU 808, the fast dormancy manager 804 may increase their accumulated inactivity cycles from one (1) to two (2). In one example, the accumulated inactivity cycles may be configured not to exceed the number of activity check cycles n. For example, when the accumulated inactivity cycles reach n (e.g., n=1), the accumulated inactivity cycles may remain n (e.g., 1) regardless how many additional cycles have passed (e.g., 2 or 3 cycles may have passed). In another example, the accumulated inactivity cycles may be configured to reflect the actual accumulated inactivity cycles, such that the accumulated inactivity cycles may be greater than n. For example, while the IMS PDU 808 is configured with n=1, after two cycles of inactivity, as shown at 821, the accumulated inactivity cycles of the IMS PDU 808 may be two (2). Similarly, the fast dormancy manager 804 may decrease their duration of inactivity of the BIP PDU 810 from 35 seconds to 30 seconds.

At 822, based on the PDU dormancy monitor table shown at 821, the fast dormancy manager 804 may determine that all PDUs either have a duration of inactivity larger than min_future_inact_duration (e.g., the duration of inactivity for the BIP PDU 810 is greater than 10 seconds) or their inactivity cycles are equal to or greater than n (e.g., the accumulated activity cycles for the internet PDU 806 and the IMS PDU 808 are both equal to or greater than their configured n).

At 824, the fast dormancy manager 804 may notify an RRC protocol 802 of the UE that the upper layers are ready to go dormant, such as described in connection with 626 of FIG. 6.

Figure 9:
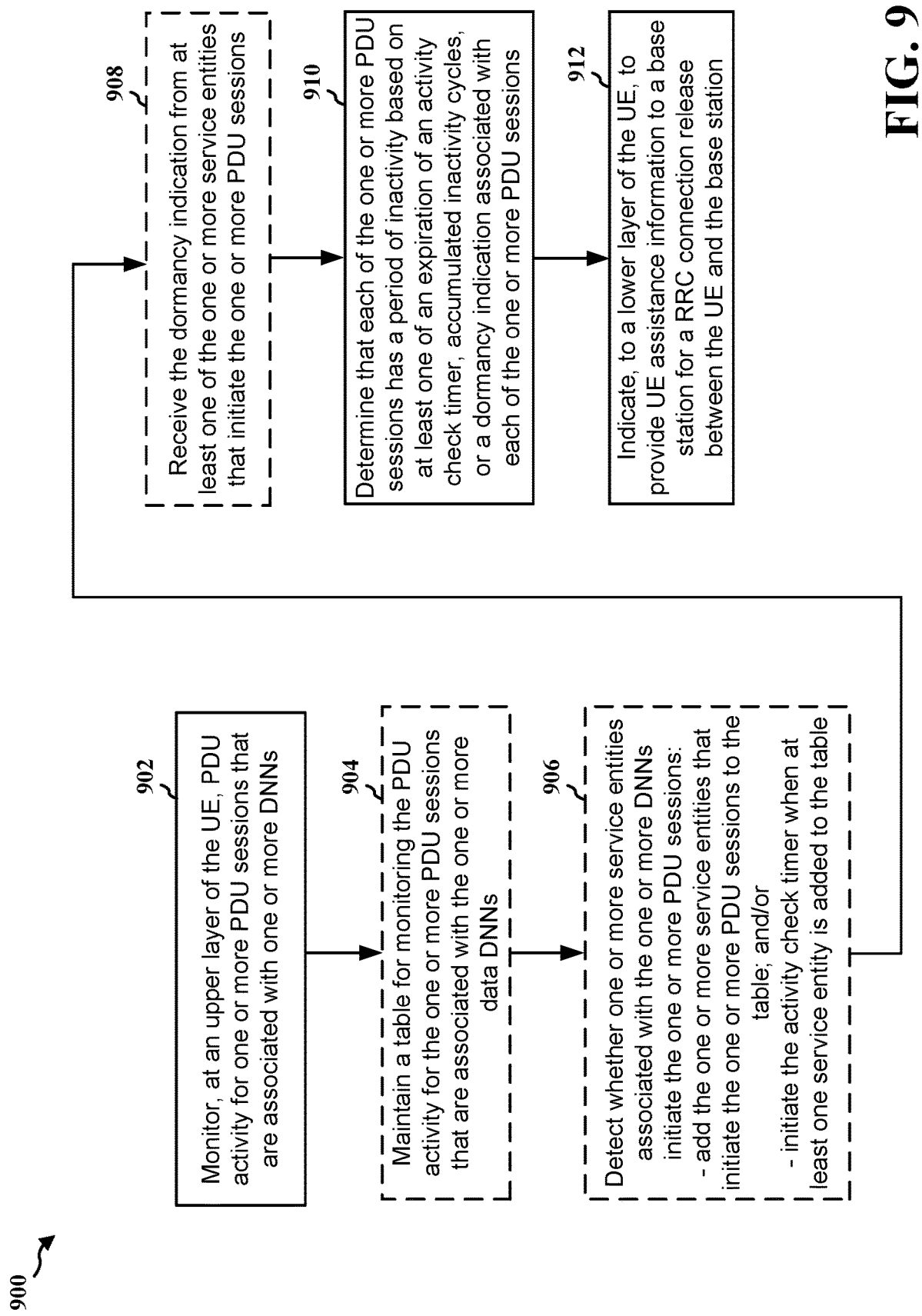
FIG. 9 is a flowchart of a method of wireless communication.

FIG. 9 is a flowchart of a method 900 of wireless communication. The method may be performed by a UE or a component/module (e.g., a dormancy manager) of a UE (e.g., the UE 104, 350, 402, 502, 602; the monitoring module 532; the fast dormancy manager 604, 704, 704; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE or the dormancy manager of the UE to monitor PDU activities established by one or more service entities, and to initiate a fast dormancy procedure (e.g., to request a base station for RRC connection release) based on the monitored PDU activities.

At 902, the dormancy manager of the UE (and/or the PDU activity monitoring component 1040 of the apparatus 1002) may monitor, at an upper layer of the UE, PDU activity for one or more PDU sessions that are associated with one or more DNNs, such as described in connection with FIGS. 6 to 8. For example, at 616, the fast dormancy manager 604 may start monitor one or more PDU sessions or service entities associated with the one or more PDU sessions. The dormancy manager may reside at the upper layer of a modem of the UE.

One or more service entities may be associated with the one or more PDU sessions and the one or more DNNs. For example, the one or more service entities may include at least one of a HLOS, an IMS, a GPS, a provisioning service, a special application service, an operator service or tethered device. In addition, the dormancy manager may provide an API for the one or more service entities that are associated with the one or more PDU sessions, where the one or more service entities may provide information related to their PDU sessions to the dormancy manager through the API. For example, the one or more service entities may send the dormancy indication to the dormancy manager through the API, such as described in connection with FIG. 5. For example, the monitoring module 532 may optionally provide an API 538 for one or more PDU users. The API 538 may enable the one or more PDU users to provide information related to their PDU sessions/activities to the monitoring module 532.

In one example, the dormancy manager may monitor, at the upper layer of the UE, the PDU activity for multiple PDU sessions that are associated with multiple DNNs. In another example, the dormancy manager may monitor, at the upper layer of the UE, a tethered device that exchanges PDUs with the base station via the UE. In another example, the dormancy manager may monitor the PDU sessions on multiple network slices and/or on multiple radio bearers associated with multiple PDU sessions.

At 904, the dormancy manager of the UE may maintain a table for monitoring the PDU activity for the one or more PDU sessions that are associated with the one or more DNNs, such as described in connection with FIGS. 6 to 8. For example, at 610 (or 716 to 722, 815 to 821), the fast dormancy manager 604 may maintain a PDU dormancy monitor table 612 for one or more PDU sessions of the one or more DNNs. The dormancy manager may update the table based on the expiration of the activity check timer associated with the one or more PDU sessions, the accumulated inactivity cycles associated with the one or more PDU sessions, and/or the dormancy indication associated with the one or more PDU sessions. For example, as each of the one or more PDU sessions may be configured with a number of activity check cycles, the dormancy manager may use the number of activity check cycles to determine whether an associated PDU session is inactive.

At 906, the dormancy manager of the UE may detect whether one or more service entities associated with the one or more DNNs initiate the one or more PDU sessions. The dormancy manager may add the one or more service entities that initiate the one or more PDU sessions to the table and initiate the activity check timer when at least one service entity is added to the table, such as described in connection with FIGS. 6 to 8. For example, at 714 or 814, after detecting that the internet PDU 706/806, the IMS PDU 708/808, and the BIP PDU 710/810 are connected to the PDU, the dormancy manager may add these service entities to the PDU dormancy monitor table and initiate the activity check timer (e.g., 714/814) when at least one service entity is added to the table.

At 908, the dormancy manager of the UE may receive the dormancy indication from at least one of the one or more service entities that initiate the one or more PDU sessions, such as described in connection with FIGS. 6 to 8. For example, at 620, a PDU client may call the dormancy API, or at 816, the BIP PDU 810 may transmit a dormancy indication to the fast dormancy manager of the UE, etc.

At 910, the dormancy manager of the UE (and/or the RRC release component 1042 of the apparatus 1002) may determine that each of the one or more PDU sessions has a period of inactivity based on at least one of an expiration of an activity check timer, accumulated inactivity cycles, or a dormancy indication associated with each of the one or more PDU sessions, such as described in connection with FIGS. 6 to 8. For example, at 624 or 640 (or at 718/818), the fast dormancy manager 604 may check whether all monitored PDU sessions are either having a future inactivity duration larger than the minimum future inactivity duration or the accumulated inactivity cycles for the PDU sessions are equal to their respective number of activity check cycles. When all monitored PDU sessions either have a future inactivity duration larger than the minimum future inactivity duration or the accumulated inactivity cycles for the PDU sessions are equal to their respective number of activity check cycles, the fast dormancy manager 604 may determine that there are no active PDU activities for the monitored service entities.

In one example, the dormancy manager may determine that a PDU session is inactive when the period of inactivity associated with the PDU session is larger than a threshold or the accumulated inactivity cycles for the PDU session reaches a defined number, such as described in connection with 622 or 640 of FIG. 6. In another example, the dormancy manager may detect whether there is PDU activity for one or more service entities that initiate the one or more PDU sessions while the activity check timer is running. Then the dormancy manager may increase the accumulated inactivity cycles for PDU sessions that do not have PDU activities by one when the activity check timer expires. Then the dormancy manager may reset the activity check timer.

At 912, the dormancy manager of the UE (and/or the PDU activity monitoring component 1040 of the apparatus 1002) may indicate, to a lower layer of the UE, to provide UE assistance information to a base station for a RRC connection release between the UE and the base station, such as described in connection with FIGS. 6 to 8. For example, at 626 (or at 724/824), the fast dormancy manager 604 may inform the RRC protocol or lower layers of the UE 602 that upper layers may go dormant or are ready to go dormant, where the UE 602 may transmit a UE assistance information to the network to request the network for an RRC connection release. As such, the dormancy manager of the UE may transmit, from the lower layer, the UE assistance information about the RRC connection release to the base station.

Figure 10:
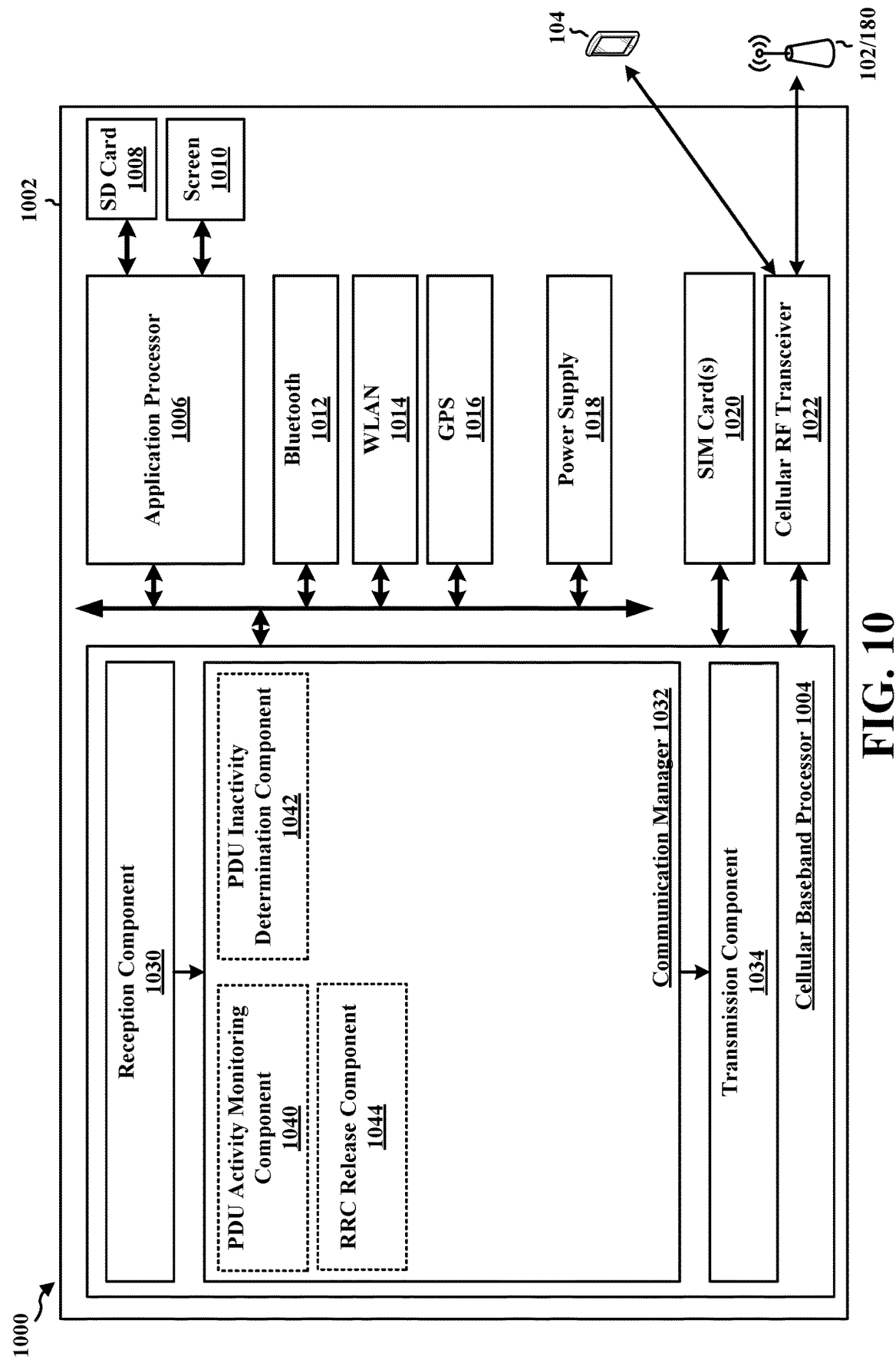
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a PDU activity monitoring component 1040 that is configured to monitor, at an upper layer of the UE, PDU activity for one or more PDU sessions that are associated with one or more DNNs, e.g., as described in connection with 902 of FIG. 9. The communication manager 1032 further includes a PDU inactivity determination component 1042 that is configured to determine that each of the one or more PDU sessions has a period of inactivity based on at least one of an expiration of an activity check timer, accumulated inactivity cycles, or a dormancy indication associated with each of the one or more PDU sessions, e.g., as described in connection with 910 of FIG. 9. The communication manager 1032 further includes a RRC release component 1044 that is configured to indicate, to a lower layer of the UE, to provide UE assistance information to a base station for a RRC connection release between the UE and the base station, e.g., as described in connection with 912 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for monitoring, at an upper layer of the UE, PDU activity for one or more PDU sessions that are associated with one or more DNNs. The apparatus 1002 includes means for determining that each of the one or more PDU sessions has a period of inactivity based on at least one of an expiration of an activity check timer, accumulated inactivity cycles, or a dormancy indication associated with each of the one or more PDU sessions. The apparatus 1002 includes means for indicating, to a lower layer of the UE, to provide UE assistance information to a base station for a RRC connection release between the UE and the base station.

In another configuration, the apparatus 1002 may include means for maintaining a table for monitoring the PDU activity for the one or more PDU sessions that are associated with the one or more data DNNs. The apparatus 1002 may include means for updating the table based on the expiration of the activity check timer associated with the one or more PDU sessions, based on the accumulated inactivity cycles associated with the one or more PDU sessions and/or based on the dormancy indication associated with the one or more PDU sessions. The apparatus 1002 may include means for using the number of activity check cycles to determine whether an associated PDU session is inactive.

In another configuration, the apparatus 1002 may include means for detecting whether one or more service entities associated with the one or more DNNs initiate the one or more PDU sessions. The apparatus 1002 may include means for adding the one or more service entities that initiate the one or more PDU sessions to the table. The apparatus 1002 may include means for initiating the activity check timer when at least one service entity is added to the table. In such configuration, the apparatus 1002 may include means for receiving the dormancy indication from each of the one or more service entities that initiate the one or more PDU sessions and means for determining that each of the one or more PDU sessions is inactive when the period of inactivity is larger than a threshold or the accumulated inactivity cycles reaches a defined number. In such configuration, the apparatus 1002 may include means for detecting whether there is PDU activity for each of the one or more service entities that initiate the one or more PDU sessions while the activity check timer is running and means for increasing the number of activity check cycles associated with each of the service entities by one when the activity check timer expires and no PDU activity is detected, and means for resetting the activity check timer.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if", "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is method of wireless communication at a dormancy manager of a UE, comprising: monitoring, at an upper layer of the UE, PDU activity for one or more PDU sessions that are associated with one or more DNNs; determining that each of the one or more PDU sessions has a period of inactivity based on at least one of an expiration of an activity check timer, accumulated inactivity cycles, or a dormancy indication associated with each of the one or more PDU sessions; and indicating, to a lower layer of the UE, to provide UE assistance information to a base station for a RRC connection release between the UE and the base station.

In aspect 2, the method of aspect 1 further comprises: transmitting, from the lower layer, the UE assistance information about the RRC connection release to the base station.

In aspect 3, the method of aspect 1 or aspect 2 further includes that the dormancy manager monitors, at the upper layer of the UE, the PDU activity for multiple PDU sessions that are associated with multiple DNNs.

In aspect 4, the method of any of aspects 1-3 further includes that the dormancy manager monitors, at the upper layer of the UE, a tethered device that exchanges PDUs with the base station via the UE.

In aspect 5, the method of any of aspects 1-4 further includes that the method is performed by the dormancy manager at the upper layer of a modem of the UE.

In aspect 6, the method of any of aspects 1-5 further includes that one or more service entities are associated with the one or more PDU sessions and the one or more DNNs.

In aspect 7, the method of any of aspects 1-6 further includes that the dormancy manager provides an API for the one or more service entities that are associated with the one or more PDU sessions.

In aspect 8, the method of any of aspects 1-7 further includes that the one or more service entities include at least one of a HLOS, an IMS, a GPS, a provisioning service, a special application service, an operator service or tethered device.

In aspect 9, the method of any of aspects 1-8 further includes that the dormancy manager monitors the PDU sessions on multiple network slices.

In aspect 10, the method of any of aspects 1-9 further includes that the dormancy manager monitors the PDU sessions on multiple radio bearers associated with multiple PDU sessions.

In aspect 11, the method of any of aspects 1-10 further comprises: maintaining a table for monitoring the PDU activity for the one or more PDU sessions that are associated with the one or more DNNs.

In aspect 12, the method of any of aspects 1-11 further comprises: updating the table based on the expiration of the activity check timer associated with the one or more PDU sessions.

In aspect 13, the method of any of aspects 1-12 further comprises: updating the table based on the accumulated inactivity cycles associated with the one or more PDU sessions.

In aspect 14, the method of any of aspects 1-13 further comprises: updating the table based on the dormancy indication associated with the one or more PDU sessions.

In aspect 15, the method of any of aspects 1-14 further includes that each of the one or more PDU sessions is configured with a number of activity check cycles, the method further comprises: using the number of activity check cycles to determine whether an associated PDU session is inactive.

In aspect 16, the method of any of aspects 1-15 further comprises: detecting whether one or more service entities associated with the one or more DNNs initiate the one or more PDU sessions; adding the one or more service entities that initiate the one or more PDU sessions to the table; and initiating the activity check timer when at least one service entity is added to the table.

In aspect 17, the method of any of aspects 1-16 further comprises: receiving the dormancy indication from one or more service entities that initiate the one or more PDU sessions; and determining that a PDU session is inactive when the period of inactivity associated with the PDU session is larger than a threshold or the accumulated inactivity cycles for the PDU session reaches a defined number.

In aspect 18, the method of any of aspects 1-17 further comprises: detecting whether there is PDU activity for one or more service entities that initiate the one or more PDU sessions while the activity check timer is running; increasing the accumulated inactivity cycles for PDU sessions that do not have PDU activities by one when the activity check timer expires; and resetting the activity check timer.

In aspect 19, the method of any of aspects 1-18 further includes that the dormancy manager receives the dormancy indication from the one or more service entities through the API.

In aspect 20, the method of any of aspects 1-19 further includes that the dormancy manager receives information related to the one or more PDU sessions from the one or more service entities through the API.

Aspect 21 is an apparatus for wireless communication including at least one processor coupled to a memory and configured to implement a method as in any of aspects 1 to 20.

Aspect 22 is an apparatus for wireless communication including means for implementing a method as in any of aspects 1 to 20.

Aspect 23 is a non-transitory computer-readable storage medium storing computer executable code, where the code when executed by a processor causes the processor to implement a method as in any of aspects 1 to 20.

What is claimed is:

1. A method of wireless communication performed by a user equipment (UE), comprising:
   monitoring protocol data unit (PDU) activity for a PDU session that is associated with one or more data network names (DNNs);
   determining that the PDU session has a period of inactivity;
   maintaining a record for monitoring the PDU activity for the PDU session that is associated with the one or more DNNs; and
   updating the record based on an accumulated number of inactivity cycles associated with the PDU session.

2. The method of claim 1, further comprising:
   transmitting UE assistance information including radio resource control (PJRC) connection release information.

3. The method of claim 1, further comprising:
   monitoring, at an upper layer of the UE, a tethered device that exchanges PDUs with a base station via the UE.

4. The method of claim 1, wherein the method is performed by a dormancy manager at an upper layer of a modem of the UE.

5. The method of claim 1, wherein one or more service entities are associated with the PDU session and the one or more DNNs.

6. The method of claim 5, further comprising: providing an application programming interface (API) for the one or more service entities.

7. The method of claim 6, further comprising:
   receiving a dormancy indication from the one or more service entities through the API; and
   updating the record based on the dormancy indication.

8. The method of claim 6, further comprising:
   receiving information related to the PDU session from the one or more service entities through the API.

9. The method of claim 6, wherein the one or more service entities include at least one of a high level operating system (HLOS), an internet protocol (IP) multimedia subsystem (IMS), a global positioning system (GPS), a provisioning service, a special application service, an operator service, or a tethered device.

10. The method of claim 1, further comprising:
    updating the record based on expiration of an activity check timer associated with the PDU session.

11. The method of claim 1, further comprising:
    updating the record based on a dormancy indication associated with the PDU session.

12. The method of claim 1, wherein the PDU session is configured with a number of activity check cycles, and wherein the method further comprises:
  determining, based on the number of activity check cycles, whether the PDU session is inactive.

13. The method of claim 12, further comprising:
  detecting whether one or more service entities associated with the one or more DNNs initiate the PDU session;
  adding the one or more service entities that initiate the PDU session to the record;
  initiating an activity check timer when at least one service entity is added to the record; and updating the record based on expiration of the activity check timer.

14. The method of claim 13, further comprising:
  determining that the PDU session is inactive when the period of inactivity associated with the PDU session is greater than a threshold or the accumulated number of inactivity cycles reaches the number of activity check cycles.

15. The method of claim 13, further comprising:
  detecting whether there is PDU activity for the one or more service entities that initiate the PDU session while the activity check timer is running; increasing the accumulated number of inactivity cycles for the PDU session when the activity check timer expires; and resetting the activity check timer.

16. A user equipment (UE) for wireless communication, comprising:
  a memory; and
  at least one processor coupled to the memory, wherein the UE is configured to:
  monitor protocol data unit (PDU) activity for a PDU session that is associated with one or more data network names (DNNs);
  determine that the PDU session has a period of inactivity;
  maintain a record for monitoring the PDU activity for the PDU session that is associated with the one or more DNNs; and
  update the record based on an accumulated number of inactivity cycles associated with the PDU session.

17. The UE of claim 16, wherein the UE is configured to:
  transmit UE assistance information including radio resource control (RRC) connection release information.

18. The UE of claim 16, wherein the UE is configured to monitor, at an upper layer of the UE, a tethered device that exchanges PDUs with a base station via the UE.

19. The UE of claim 16, wherein one or more service entities are associated with the PDU session and the one or more DNNs.

20. The UE of claim 19, wherein the UE is configured to:
  receive a dormancy indication from the one or more service entities through an application programming interface (API), wherein the API is associated with the one or more service entities; and
  update the record based on the dormancy indication.

21. A user equipment (UE) for wireless communication comprising:
  means for monitoring protocol data unit (PDU) activity for a PDU session that is associated with one or more data network names (DNNs);
  means for determining that the PDU session has a period of inactivity;
  means for maintaining a record for monitoring the PDU activity for the PDU session that is associated with the one or more DNNs; and
  means for updating the record based on an accumulated number of inactivity cycles associated with the PDU session.

22. A non-transitory computer-readable medium having computer executable code stored thereon that, when executed by at least one processor of a user equipment (UE), causes the UE to:
  monitor protocol data unit (PDU) activity for a PDU session that is associated with one or more data network names (DNNs);
  determine that the PDU session has a period of inactivity;
  maintain a record for monitoring the PDU activity for the PDU session that is associated with the one or more DNNs; and
  update the record based on an accumulated number of inactivity cycles associated with the PDU session.

23. The UE of claim 16, wherein the UE is configured to:
  update the record based on expiration of an activity check timer associated with the PDU session.

24. The UE of claim 16, wherein the UE is configured to perform:
  update the record based on a dormancy indication associated with the PDU session.

25. The UE of claim 16, wherein the PDU session is configured with a number of activity check cycles, and wherein the UE is further configured to:
  determine whether the PDU session is inactive based on the number of activity check cycles.

26. The UE of claim 25, wherein the UE is configured to:
  detect whether one or more service entities associated with the one or more DNNs initiate the PDU session;
  add the one or more service entities that initiate the PDU session to the record;
  initiate an activity check timer when at least one service entity is added to the record; and
  update the record based on expiration of the activity check timer.

27. The UE of claim 26, wherein the UE is configured to:
  determine that the PDU session is inactive when the period of inactivity associated with the PDU session is greater than a threshold or the accumulated number of inactivity cycles reaches the number of activity check cycles.

28. The UE of claim 26, wherein the UE is configured to:
  detect whether there is PDU activity for the one or more service entities that initiate the PDU session while the activity check timer is running;
  increase the accumulated number of inactivity cycles for the PDU session when the activity check timer expires; and
  reset the activity check timer.

29. The UE of claim 23, wherein the UE is configured to:
  initiate the activity check timer when at least one service entity is added to the record, wherein the at least one service entity is associated with the one or more DNNs.

30. The UE of claim 23, wherein, to update the record based on the expiration of the activity check timer, the UE is configured to increase the accumulated number of inactivity cycles for the PDU session when the PDU session does not have any PDU activity between initiation of the activity check timer and the expiration of the activity check timer.

31. The UE of claim 16, wherein, to determine that the PDU session has the period of inactivity, the UE is configured to determine that the PDU session as the period of inactivity based on at least one of: expiration of an activity check timer associated with the PDU session, the accumulated number of inactivity cycles, or a dormancy indication associated with the PDU session.

32. The UE of claim 16, wherein the accumulated number of inactivity cycles is equal to one.

33. The UE of claim 16, wherein the accumulated number of inactivity cycles is greater than one.

34. The method of claim 2, further comprising:
indicating, by an upper layer of the UE, to a lower layer of the UE to cause transmission of the UE assistance information.

35. The method of claim 1, wherein the determination that the PDU session has the period of inactivity is based on at least one of: expiration of an activity check timer associated with the PDU session, the accumulated number of inactivity cycles, or a dormancy indication associated with the PDU session.

36. The method of claim 1, wherein the accumulated number of inactivity cycles is equal to one.

37. The method of claim 1, wherein the accumulated number of inactivity cycles is greater than one.

38. The UE of claim 21, wherein the PDU session is configured with a number of activity check cycles, and wherein the UE further includes means for determining whether the PDU session is inactive based on the number of activity check cycles.

39. The non-transitory computer-readable medium of claim 22, wherein the PDU session is configured with a number of activity check cycles, and wherein the code, when executed by the at least one processor of the UE, further causes the UE to: determine whether the PDU session is inactive based on the number of activity check cycles.

40. The method of claim 10, wherein the method comprises:
updating the record based on a dormancy indication associated with the PDU session.

41. The method of claim 1, wherein the record includes a table or a chart.

42. The UE of claim 23, wherein the UE is configured to:
update the record based on a dormancy indication associated with the PDU session.

43. The UE of claim 16, wherein the record includes a table or a chart.

* * * * *